United States Patent
Nash et al.

(10) Patent No.: US 10,223,801 B2
(45) Date of Patent: *Mar. 5, 2019

(54) CODE DOMAIN POWER CONTROL FOR STRUCTURED LIGHT

(71) Applicant: QUALCOMM Incorporated, San Diego, CA (US)

(72) Inventors: James Wilson Nash, San Diego, CA (US); Kalin Mitkov Atanassov, San Diego, CA (US); Albrecht Johannes Lindner, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,586

(22) Filed: Nov. 9, 2017

(65) Prior Publication Data

US 2018/0068456 A1 Mar. 8, 2018

Related U.S. Application Data

(63) Continuation of application No. 15/060,028, filed on Mar. 3, 2016, now Pat. No. 9,846,943.

(Continued)

(51) Int. Cl.
  *G06K 9/00* (2006.01)
  *G06T 7/50* (2017.01)
  (Continued)

(52) U.S. Cl.
  CPC ............... *G06T 7/50* (2017.01); *G01B 11/22* (2013.01); *G01B 11/2513* (2013.01); *G06K 9/18* (2013.01);
  (Continued)

(58) Field of Classification Search
  CPC ........... G06T 7/50; G06T 7/521; G01B 11/22; G01B 11/2513; G06K 9/4661; G06K 9/18; G06K 9/6267; G06K 9/52; G06K 9/6215
  See application file for complete search history.

(56) References Cited

U.S. PATENT DOCUMENTS

| 4,653,104 A | 3/1987 | Tamura |
| 6,229,913 B1 | 5/2001 | Nayar et al. |

(Continued)

FOREIGN PATENT DOCUMENTS

| CN | 102831582 A | 12/2012 |
| CN | 103796004 A | 5/2014 |

(Continued)

OTHER PUBLICATIONS

Buyukyazi T., et al., "Real-time Image Stabilization and Mosaicking by Using Ground Station CPU in UAV surveillance", 2013 6th International Conference on Recent Advances in Space Technologies (RAST), IEEE, Jun. 12, 2013 (Jun. 12, 2013), pp. 121-126, XP032477136, DOI : 10. 1109/RAST .2013.6581183 ISBN : 978-1-4673-6395-2.

(Continued)

*Primary Examiner* — John B Strege
(74) *Attorney, Agent, or Firm* — Paradice and Li LLP

(57) ABSTRACT

Systems and methods for controlling structured light laser systems are disclosed. One aspect is a structured light system. The system includes a memory device configured to store a depth map. The system further includes an image projecting device including a laser system configured to project codewords. The system further includes a receiver device including a sensor, the receiver device configured to sense the projected codewords reflected from an object. The system further includes a processing circuit configured to retrieve a portion of the depth map and calculate expected (Continued)

codewords from the depth map. The system further includes a feedback system configured to control the output power of the laser system based on the sensed codewords and the expected codewords.

30 Claims, 17 Drawing Sheets

Related U.S. Application Data

(60) Provisional application No. 62/212,507, filed on Aug. 31, 2015.

(51) Int. Cl.
| | | |
|---|---|---|
| G06K 9/18 | (2006.01) | |
| G06K 9/46 | (2006.01) | |
| G06K 9/62 | (2006.01) | |
| G06K 9/52 | (2006.01) | |
| G01B 11/22 | (2006.01) | |
| G01B 11/25 | (2006.01) | |
| G06T 7/521 | (2017.01) | |

(52) U.S. Cl.
CPC ............ *G06K 9/4661* (2013.01); *G06K 9/52* (2013.01); *G06K 9/6215* (2013.01); *G06K 9/6267* (2013.01); *G06T 7/521* (2017.01)

(56) References Cited

U.S. PATENT DOCUMENTS

| | | | |
|---|---|---|---|
| 7,212,663 | B2 | 5/2007 | Tomasi |
| 7,440,590 | B1 | 10/2008 | Hassebrook et al. |
| 7,894,525 | B2 | 2/2011 | Piehl et al. |
| 7,916,932 | B2 | 3/2011 | Lee et al. |
| 8,531,535 | B2 | 9/2013 | Kwatra et al. |
| 8,724,854 | B2 | 5/2014 | Jin et al. |
| 8,806,305 | B2 | 8/2014 | Przybylski |
| 9,530,215 | B2 | 12/2016 | Siddiqui et al. |
| 9,635,339 | B2 | 4/2017 | Campbell et al. |
| 9,638,801 | B2 | 5/2017 | Boufounos et al. |
| 9,846,943 | B2 * | 12/2017 | Nash ............... G06K 9/18 |
| 2004/0151365 | A1 | 8/2004 | An et al. |
| 2005/0018209 | A1 | 1/2005 | Lemelin et al. |
| 2005/0229069 | A1 | 10/2005 | Hassner et al. |
| 2006/0098212 | A1 | 5/2006 | Forster et al. |
| 2008/0128501 | A1 | 6/2008 | Thebault et al. |
| 2008/0130016 | A1 | 6/2008 | Steinbichler et al. |
| 2008/0205748 | A1 | 8/2008 | Lee et al. |
| 2009/0022367 | A1 | 1/2009 | Sasaki |
| 2009/0310822 | A1 | 12/2009 | Chang et al. |
| 2009/0322859 | A1 | 12/2009 | Shelton et al. |
| 2010/0074532 | A1 | 3/2010 | Gordon et al. |
| 2010/0180176 | A1 | 7/2010 | Yosoku et al. |
| 2011/0096832 | A1 | 4/2011 | Zhang et al. |
| 2011/0147620 | A1 | 6/2011 | Arai et al. |
| 2012/0019836 | A1 | 1/2012 | Honma et al. |
| 2012/0056874 | A1 | 3/2012 | Kim et al. |
| 2012/0056982 | A1 | 3/2012 | Katz et al. |
| 2012/0086803 | A1 | 4/2012 | Malzbender et al. |
| 2012/0229609 | A1 | 9/2012 | Yamada et al. |
| 2012/0242795 | A1 | 9/2012 | Kane et al. |
| 2012/0294510 | A1 | 11/2012 | Zhang et al. |
| 2013/0038694 | A1 | 2/2013 | Nichani et al. |
| 2013/0050426 | A1 | 2/2013 | Sarmast et al. |
| 2013/0128121 | A1 | 5/2013 | Agarwala et al. |
| 2013/0141544 | A1 | 6/2013 | Tsuyuki |
| 2013/0162629 | A1 | 6/2013 | Huang et al. |
| 2013/0293684 | A1 | 11/2013 | Becker et al. |
| 2013/0301908 | A1 | 11/2013 | Shim et al. |
| 2013/0314696 | A1 | 11/2013 | Atanassov et al. |
| 2013/0315354 | A1 | 11/2013 | Atanassov et al. |
| 2013/0315501 | A1 | 11/2013 | Atanassov et al. |
| 2013/0342671 | A1 | 12/2013 | Hummel et al. |
| 2014/0002610 | A1 | 1/2014 | Xi et al. |
| 2014/0118539 | A1 | 5/2014 | Ota et al. |
| 2014/0132721 | A1 | 5/2014 | Martinez et al. |
| 2014/0132722 | A1 | 5/2014 | Martinez et al. |
| 2014/0160309 | A1 | 6/2014 | Karpenko |
| 2014/0168362 | A1 | 6/2014 | Hannuksela et al. |
| 2014/0192154 | A1 | 7/2014 | Jeong et al. |
| 2014/0219549 | A1 | 8/2014 | Choi et al. |
| 2014/0223256 | A1 | 8/2014 | Sakai et al. |
| 2014/0240318 | A1 | 8/2014 | Coombe et al. |
| 2014/0241614 | A1 | 8/2014 | Lee |
| 2014/0380115 | A1 | 12/2014 | Bar-On |
| 2015/0110347 | A1 | 4/2015 | Suzuki |
| 2015/0117514 | A1 | 4/2015 | Choi et al. |
| 2015/0178592 | A1 | 6/2015 | Ratcliff et al. |
| 2015/0193938 | A1 | 7/2015 | Freedman et al. |
| 2015/0221093 | A1 | 8/2015 | Sagawa et al. |
| 2015/0229911 | A1 | 8/2015 | Ge et al. |
| 2015/0310620 | A1 | 10/2015 | Aviv et al. |
| 2015/0381972 | A1 | 12/2015 | Kowdle et al. |
| 2016/0050372 | A1 | 2/2016 | Lindner |
| 2016/0063309 | A1 | 3/2016 | Konolige et al. |
| 2016/0202050 | A1 | 7/2016 | Lee et al. |
| 2016/0255332 | A1 | 9/2016 | Nash et al. |
| 2016/0267671 | A1 | 9/2016 | Atanassov |
| 2017/0061634 | A1 | 3/2017 | Nash et al. |

FOREIGN PATENT DOCUMENTS

| | | |
|---|---|---|
| JP | 2012079294 A | 4/2012 |
| JP | 2012141252 A | 7/2012 |
| KR | 20140088309 A | 7/2014 |
| WO | WO-1992010830 A1 | 6/1992 |
| WO | WO-2001081859 A1 | 11/2001 |
| WO | WO-2013068548 A2 | 5/2013 |
| WO | WO-2013074510 A1 | 5/2013 |
| WO | WO-2015152829 A1 | 10/2015 |
| WO | WO-2016137753 | 9/2016 |

OTHER PUBLICATIONS

Hong W., et al., "Video Stabilization and Rolling Shutter Distortion Reduction", 2010 17th IEEE International Conference on Image Processing (ICIP 2010), Sep. 26-29, 2010, Hong Kong, China, IEEE, Piscataway, NJ, USA, Sep. 26, 2010 (Sep. 26, 2010), pp. 3501-3504, XP031811299, ISBN: 978-1-4244-7992-4 abstract section 2.

International Search Report and Written Opinion—PCT/US2016/047179—ISA/EPO—Nov. 14, 2016.

Lindner A., et al., "Depth Enhanced and Content Aware Video Stabilization", Proceedings of SPIE, vol. 9411, Mar. 11, 2015 (Mar. 11, 2015), pp. 941106-1 to 941106-6, XP055229514, US ISSN: 0277-786X, DOI: 10.1117/12.2083443 ISBN: 978-1-62841-839-2.

Tsalakanidou et al., "Real-time Acquisition of Depth and Color Images using Structured Light and its Application to 3D Face Recognition," Real-Time Imaging, Academic Press Limited, GB, vol. 11, No. 5-6, Oct. 1, 2005 (Oct. 1, 2005), pp. 358-369, XP005074682, ISSN: 1077-2014, DOI: 10.1016/J.RTI.2005.06.006.

Wijenayake U., et al., "An Error Correcting 3D Scanning Technique Using Dual Pseudorandom Arrays," 3D Imaging, Modeling, Processing, Visualization and Transmission (3DIMPVT), 2012 Second International Conference On, IEEE, Oct. 13, 2012 (Oct. 13, 2012), pp. 517-523, XP032277316, DOI: 10.1109/3DIMPVT.2012.68 ISBN: 978-1-4673-4470-8.

Wijenayake U., et al., "Dual Pseudorandom Array Technique for Error Correction and Hole Filling of Color Structured-light three-dimensional Scanning," Optical Engineering., vol. 54(4), Apr. 27, 2015 (Apr. 27, 2015), p. 043109, XP055309719, Bellingham ISSN: 0091-3286, DOI: 10.1117/1.0E.54.4.043109.

Yahyanejad S., et al., "Incremental, Orthorectified and Loop-independent Mosaicking of Aerial Images taken by Micro UAVs", Robotic and Sensors Environments (ROSE), 2011 IEEE International Symposium On, IEEE, Sep. 17, 2011 (Sep. 17, 2011), pp.

(56) References Cited

OTHER PUBLICATIONS 137-142, XP031961274, DOI: 10.1109/ROSE.2011.6058531 ISBN: 978-1-4577-0819-0 abstract sections III, IV, VI.
Zhang J., et al., "Robust Human Tracking Algorithm Applied for Occlusion Handling", Frontier of Computer Science and Technology (FCST), 2010 Fifth International Conference on, IEEE, Piscataway, NJ, USA, Aug. 18, 2010 (Aug. 18, 2010), pp. 546-551, XP031755281, ISBN: 978-1-4244-7779-1.

* cited by examiner

CODE DOMAIN POWER CONTROL FOR STRUCTURED LIGHT

CROSS REFERENCE TO RELATED APPLICATIONS

This application is a continuation of U.S. application Ser. No. 15/060,028 filed on Mar. 3, 2016, which claims the benefit of U.S. Provisional Patent Application No. 62/212,507, filed on Aug. 31, 2015, entitled "CODE DOMAIN POWER CONTROLS FOR STRUCTURED LIGHT." The content of each of these applications is hereby incorporated by reference herein in its entirety.

BACKGROUND

Field

Various features relate to active depth sensing, and more specifically to controlling output power of a structured light codeword transmitter using code domain statistics.

Description of the Related Art

Imaging devices that are structured light active sensing systems include a transmitter and a receiver configured to transmit and receive patterns corresponding to spatial codes (or "codewords") to generate a depth map that indicates the distance of one or more objects in a scene from the imaging device. The farther away an object in a scene is from the transmitter and the receiver, the closer a received codeword reflected from the object is from its original position (compared to the transmitted codeword) because a propagation path of the outgoing codeword and the reflected incoming codeword are more parallel. Conversely, the closer the object is to the transmitter and receiver, the farther the received codeword is from its original position in the transmitted codeword. Accordingly, the difference between the position of a received codeword and the corresponding transmitted codeword may be used to determine the depth of an object in a scene. Structured light active sensing systems may use these determined depths to generate a depth map of a scene, which may be a three dimensional representation of the scene. Many applications may benefit from determining a depth map of a scene, including image quality enhancement and computer vision techniques.

Each codeword may be represented by rows and columns of intensity values corresponding to symbols. For example, binary spatial codes may use zeros (0's) and ones (1's), corresponding to dark and bright intensity values, to represent a binary pattern. Other spatial codes may use more than two different intensity values corresponding to more than two symbols. Other spatial representations also may be used.

Generating a depth map depends on detecting codewords. To detect codewords made up of an array of symbols, decoding filters may identify spatial boundaries for codewords and symbols, and classify symbols as, for example, "0" or "1" based on their intensity values. Decoding filters may use matched filters, corresponding to the set of harmonic basis functions used to define the set of possible codewords, to classify incoming basis functions. Therefore, depth map accuracy depends on accurately receiving symbols, codewords, and/or basis functions.

If the power level of a light source used to project a pattern (for example, a laser) is too low, then the spots corresponding to brighter symbols may be too dark to be differentiated from darker symbols. If the power level of the light source is too high, then the spots corresponding to brighter symbols may become saturated and bleed into (blend in with) neighboring spots. When this happens, it may be difficult to accurately classify symbols, codewords, and basis functions. Optimal power level ranges may depend at least partially on object depth and surface reflectivity. Optimal power levels may vary both within scenes and between scenes.

Existing methods and systems to control light source power may not account for local variation, and may not be optimized to maximize symbol, codeword, or basis function accuracy. Accordingly, there is a need for methods and systems to control light source power for structured light systems for more accurate depth map generation.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include efficient ways to control output power of a structured light codeword transmitter using code domain statistics resulting in fewer decoding errors.

One innovation is a structured light system. The structured light system may include a memory device configured to store a depth map. The structured light system may further include an image projecting device including a laser system configured to project codewords. The structured light system may further include a receiver device including a sensor, the receiver device configured to sense the projected codewords reflected from an object. The structured light system may further include a processing circuit configured to retrieve at least a portion of a depth map stored in the memory device and calculate expected codewords from the depth map. The structured light system may further include a feedback system configured to control the output power of the laser system based on the sensed codewords and the expected codewords.

For some implementations, the processing circuit is further configured to update the depth map based on the sensed codewords. For some implementations, the memory device is further configured to store the updated depth map.

For some implementations, the feedback system is configured to determine a code domain statistic comparing the sensed codewords with the expected codewords. For some implementations, the feedback system controls the output of the laser system based at least in part on the determined code domain statistic. For some implementations, the code domain statistic quantifies symbol classification accuracy. For some implementations, the code domain statistic is the square of the difference in intensity means divided by the sum of the intensity variances.

For some implementations, the processing circuit is further configured to calculate expected received symbols from the depth map and/or previously received codewords. For some implementations, the processing circuit is further configured to assign each received intensity value to a corresponding expected received symbol. For some implementations, the processing circuit is further configured to calculate a mean intensity value for each symbol. For some implementations, the processing circuit is further configured to calculate a variance intensity value for each symbol. For some implementations, the processing circuit is further configured to calculate the code domain statistic as the square of the difference in intensity means divided by the sum of the intensity variances.

For some implementations, the code domain statistic quantifies codeword detection accuracy. For some implementations, the code domain statistic is the percentage of received codewords that match expected codewords.

For some implementations, the processing circuit is further configured to compare received codewords to expected codewords. For some implementations, the processing circuit is further configured to calculate the percentage of correctly received codewords. For some implementations, correctly received codewords correspond to expected codewords.

For some implementations, the code domain statistic quantifies basis function accuracy. For some implementations, the code domain statistic is the percentage of received basis functions that match expected basis functions.

For some implementations, the processing circuit is configured to calculate expected basis functions from the depth map and/or previously received codewords. For some implementations, the processing circuit is configured to compare received basis functions to expected basis functions. For some implementations, the processing circuit is further configured to calculate the percentage of correctly received basis functions. For some implementations, correctly received basis functions correspond to expected basis functions.

For some implementations, the feedback system controls the output power of the laser system iteratively to converge to a maximum value for the code domain statistic.

Another innovation is a method of controlling laser power in a structured light system. The method may include storing a depth map with a memory device. The method may include projecting codewords with a laser system. The method may include sensing the projected codewords reflected from an object with a receiver sensor. The method may include retrieving a portion of the depth map from the memory device. The method may include calculating expected codewords from the depth map. The method may include controlling output power of the laser system based on the sensed codewords and the expected codewords.

In various embodiments, the method may further include updating the depth map based on the sensed codewords. In various embodiments, the method may further include storing the updated depth map with the memory device.

In various embodiments, the method may further include determining a code domain statistic comparing the sensed codewords with the expected codewords. In various embodiments, the method may further include controlling output power of the laser system based at least in part on the determined code domain statistic.

In various embodiments, the method may further include calculating expected received symbols from the depth map and/or previously received codewords. In various embodiments, the method may further include assigning each received intensity value to a corresponding expected received symbol. In various embodiments, the method may further include calculating a mean intensity value for each symbol. In various embodiments, the method may further include calculating a variance intensity value for each symbol. In various embodiments, the method may further include calculating the code domain statistic as the square of the difference in intensity means divided by the sum of the intensity variances.

In various embodiments, the method may further include comparing received codewords to expected codewords. In various embodiments, the method may further include calculating the percentage of correctly received codewords, wherein correctly received codewords correspond to expected codewords.

In various embodiments, the method may further include calculating expected basis functions from the depth map and/or previously received codewords. In various embodiments, the method may further include comparing received basis functions to expected basis functions. In various embodiments, the method may further include calculating the percentage of correctly received basis functions, wherein correctly received basis functions correspond to expected basis functions.

In various embodiments, the method may further include controlling the output power of the laser system iteratively to converge to a maximum value for the code domain statistic.

Another innovation is a structured light system. The structured light system may include means for storing a depth map. The structured light system may include means for projecting codewords. The structured light system may include means for sensing the projected codewords reflected from an object. The structured light system may include means for retrieving a portion of the depth map from the means for storing a depth map. The structured light system may include means for calculating expected codewords from the depth map. The structured light system may include means for controlling output power of the projecting means based on a comparison between the sensed codewords and the expected codewords.

In various embodiments, the storing means may include a memory device. In various embodiments, the project means may include a laser system. In various embodiments, the sensing means includes a receiver sensor. In various embodiments, the retrieving means includes a processing circuit. In various embodiments, the calculating means includes the processing circuit. In various embodiments, the controlling means includes a feedback system.

In various embodiments, the structured light system further includes means for determining a code domain statistic comparing the sensed codewords with the expected codewords. In various embodiments, the structured light system further includes means for controlling output power of the laser system based at least in part on the determined code domain statistic.

Another innovation is a non-transitory computer-readable medium storing instructions that, when executed, cause a processor to perform a method. The method may include storing a depth map with a memory device. The method may include projecting codewords with a laser system. The method may include sensing the projected codewords reflected from an object with a receiver sensor. The method may include retrieving a portion of the depth map from the memory device. The method may include calculating expected codewords from the depth map. The method may include controlling output power of the laser system based on the sensed codewords and the expected codewords.

BRIEF DESCRIPTION OF THE DRAWINGS

Various features, aspects and advantages will become apparent from the description herein and drawings appended hereto, in which like reference symbols generally will identify corresponding aspects or components illustrated in the drawings. As a person of ordinary skill in the art will understand, aspects described or illustrated for an embodiment may be included in one or more other described or illustrated embodiments, if not impractical for the implementation or function of such an embodiment, unless otherwise stated.

DETAILED DESCRIPTION

Figure 1:
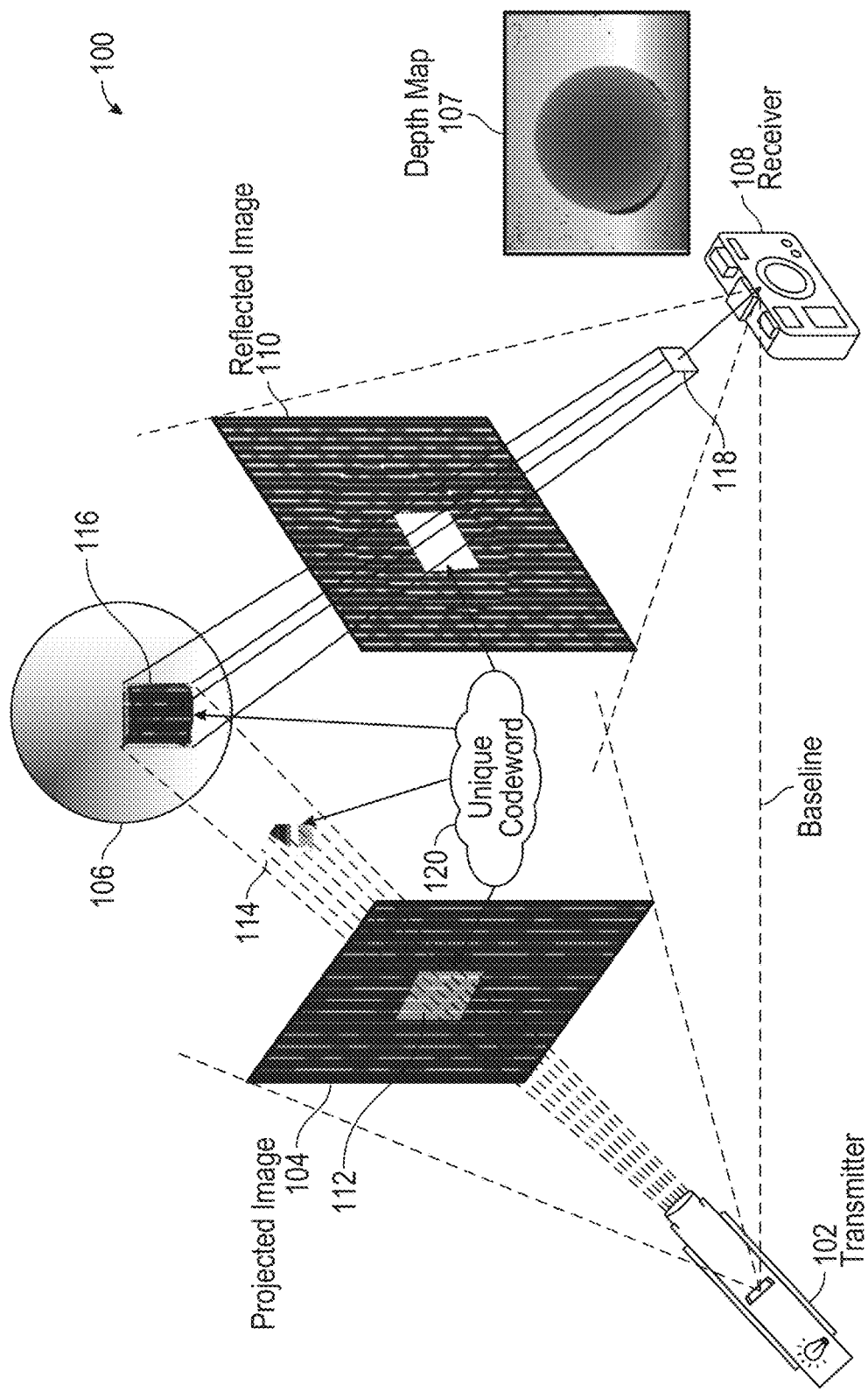
FIG. 1 is a schematic illustrating an example of an active sensing system where a known pattern is used to illuminate a scene and obtain depth information with which to generate three-dimensional (3D) information from two-dimensional (2D) images and/or information.

The following detailed description is directed to certain specific embodiments. However, the methods and systems disclosed can be embodied in a multitude of different ways. It should be apparent that aspects herein may be embodied in a wide variety of forms and that any specific structure, function, or both being disclosed herein is merely representative. Aspects disclosed herein may be implemented independently of any other aspects. Two or more of these aspects may be combined in various ways. For example, an apparatus may be implemented, or a method may be practiced, using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different imaging systems and computing devices and systems. They may use general purpose or special purpose systems.

Structured light systems generate depth maps by decoding received patterns of codewords and comparing them to the transmitted patterns. If the received symbols and codewords have well defined spatial boundaries and well separated intensity levels for different symbol values, then it is possible to decode the received patterns accurately and generate accurate depth maps. If the symbol boundaries are not well defined, and/or the intensity levels are not well separated, then detection accuracy goes down and depth map accuracy suffers.

Structured light systems transmit the patterns of codewords by emitting light at a controllable power level through a mask. In some embodiments, the light source is a laser (although it may also be another type of light source), and the mask is a diffractive optical element. When the power level of the light source is too low, the symbols may be too dark to be received accurately and correctly decoded. At a higher power level of the light source, the transmitted symbols can be more likely to be decoded because their boundaries are well delineated and, with increasing power, well separated by intensity. For example "0" symbols appear dark, and "1" symbols appear light, and there is a large intensity gap between the dark symbols and the light symbols. If the power level of the light source is too high, then the symbols may appear to bleed beyond the intended boundaries of the symbols into guard bands and even into neighboring symbols. Therefore, when a power level of the light source is too high, the symbol boundaries may be unclear as symbols may blend with each other, and the received symbols may appear significantly different than what was projected, reducing detection accuracy. In any particular scene, objects at different distances and/or having different surface characteristics may require different laser power levels for accurate decoding.

The disclosed technology includes systems and methods to control the light source power level, so that the received images can be decoded accurately. Code domain statistics are used to characterize how effectively received images can be decoded, by, for example, quantifying contrast or separation among different symbol values, quantifying codeword detection accuracy, or quantifying basis function detection accuracy. These measures directly characterize decoding accuracy, and enable control convergence to an optimal laser power level by feeding back (for example, via a negative feedback loop, or using an adaptive algorithm) the code domain statistic to the laser controller. As a result, the resulting depth map may have less decoding errors and thus be more accurate.

FIG. 1 illustrates an example of an active sensing system 100 that generates three dimensional information, such as a depth map 107, from two dimensional images. The active sensing system 100 includes a transmitter 102 and a receiver 108. The transmitter 102 projects light through a code mask to form a projected image 104. A section 112 of projected image 104 includes a unique codeword 120 that is projected onto the scene 106. The surface of object(s) in scene 106 is illuminated by spatial pattern 116, which forms part of reflected image that is sensed by receiver 108. Receiver 108 senses a portion 118 (segment) of the reflected image 110, including unique codeword 120, and compares the relative position of unique codeword 120 to other unique codewords in the code mask to determine depth information, for generating a depth map 107, of the surface of object in scene 106, as described below with regard to FIG. 3. The receiver 108 forms a depth map 107 based on depth estimates over the surfaces of the objects in the scene, which reflect other identifiable codewords from other segments of reflected image 110. Each segment 118 that is captured may be uniquely identifiable at the receiver 108 and its location relative to other segments ascertained from the known pattern of the coded mask. The receiver 108 may use pattern segmentation techniques to address distortion, decoding techniques to identify codes, and triangulation to ascertain orientation and/or depth.

Figure 2:
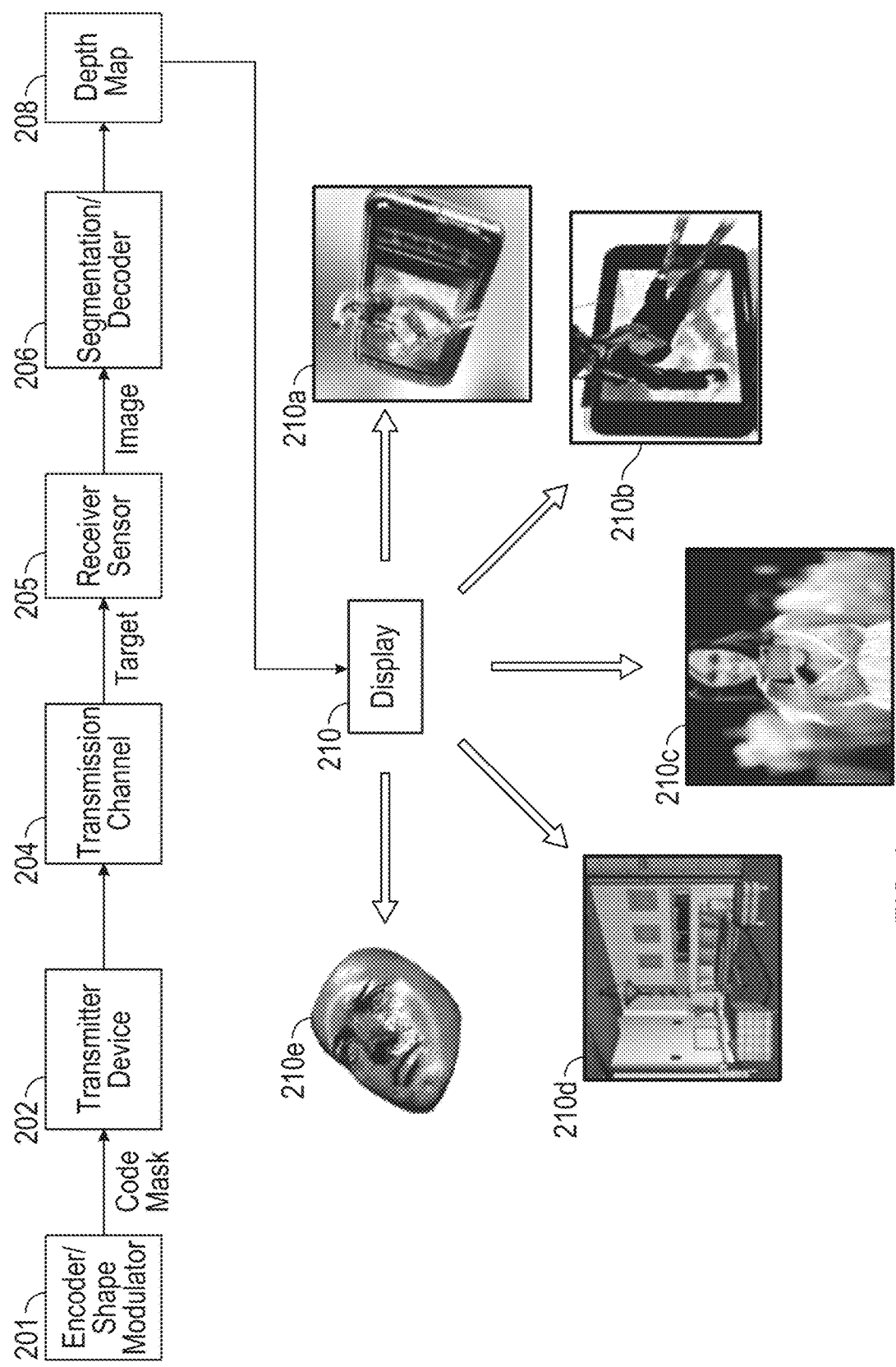
FIG. 2 is a diagram illustrating another example of a system for active sensing where a 3D scene is constructed from 2D images or information.

FIG. 2 illustrates another example of a system for active sensing to generate depth maps and display three dimensional representations of scenes. An encoder/shape modulator 201 may generate a code mask which is then projected by a transmitter device 202 over a transmission channel 204. The code mask may be projected onto a target (e.g., a scene) and the reflected light is captured by a receiver sensor 205 as a projected code mask image. The receiver sensor 205 (e.g., receiver 108 in FIG. 1), captures the reflected image of the target, which segmentation/decoder 206 segments and decodes to determine depth information used to generate depth map 208. The depth map 208 may then be used to present, generate, and/or provide a 3D image version of a target, for example, one of targets 210a-e.

Active sensing relies on being able to recognize (at the receiver sensor 205 and/or segmentation/decoder 206) spatial codes (e.g., codewords) from the code mask being projected by the transmitter device 202 on a scene. If a scene is too close to the transmitter and receiver, the surface of the scene may be angled or curved, a baseline reference plane may be tilted, and the codes may be modified under an unknown affine transformation (e.g., rotation, skew, compression, elongation, etc.). One or more aspects or features described herein may be implemented within the exemplary environments of FIGS. 1 and 2

Figure 3:
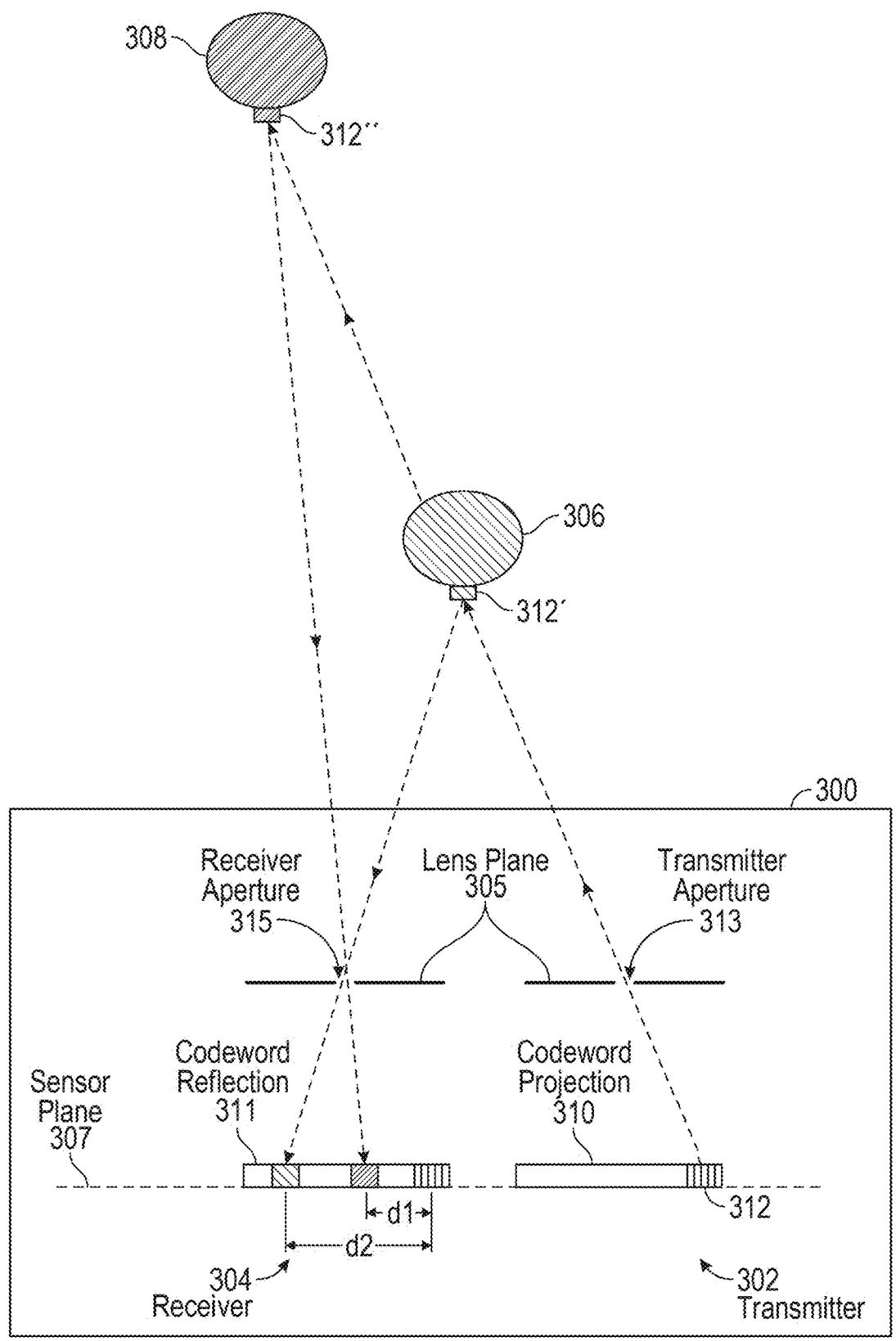
FIG. 3 is a schematic illustrating how depth may be sensed for an object or scene.

FIG. 3 illustrates an example of how depth may be sensed for one or more objects in a scene. FIG. 3 shows a device 300 including a transmitter 302 and a receiver 304. The device is illuminating two objects 306 and 308 with structured light emitted from transmitter 302 as codeword projection 310. The codeword projection 310 reflects from objects 306 and/or 308 and is received as a reflected codeword 311 by receiver 304 on sensor plane 307.

As illustrated in FIG. 3, the transmitter 302 is on the same reference plane as the receiver 304 (e.g., lens plane 305). The transmitter 302 projects the codeword projection 310 onto the objects 306 and 308 through an aperture 313.

The codeword projection 310 illuminates the object 306 as projected segment 312', and illuminates the object 308 as projected segment 312". When the projected segments 312' and 312" are received by the receiver 304 through receiver aperture 315, the reflected codeword 311 may show reflections generated from the object 308 at a first distance d1 and reflections generated from the object 306 at a second distance d2.

As shown by FIG. 3, since the object 306 is located closer to the transmitter 302 (e.g., a first distance from the transmitter device) the projected segment 312' appears at a distance d2 from its initial location. In contrast, since the object 308 is located further away (e.g., a second distance from the transmitter 302), the projected segment 312" appears at a distance d1 from its initial location (where d1<d2). That is, the further away an object is from the transmitter/receiver, the closer the received projected segment/portion/window is from its original position at the receiver 304 (e.g., the outgoing projection and incoming projection are more parallel). Conversely, the closer an object is from the transmitter/receiver, the further the received projected segment/portion/window is from its original position at the receiver 304. Thus, the difference between received and transmitted codeword position may be used as an indicator of the depth of an object. In one example, such depth (e.g., relative depth) may provide a depth value for objects depicted by each pixel or grouped pixels (e.g., regions of two or more pixels) in an image.

Various types of modulation and coding schemes may be used to generate a codeword projection or code mask. These modulation and coding schemes include, for example, temporal coding, spatial coding, and direct codification.

In temporal coding, patterns are successively projected onto the measuring surface over time. This technique has high accuracy and resolution but is less suitable for dynamic scenes.

In spatial coding, information is encoded in a local neighborhood based on shapes and patterns. Pseudorandom codes may be based on De-Bruijn or M-arrays define the codebook of valid codewords (e.g., m-ary intensity or color modulation). Pattern segmentation may not be easily attained, for example, where the shapes and patterns are distorted.

In direct codification, both horizontal and vertical pixel coordinates are encoded. Modulation may be by a monotonic phase or an intensity waveform. However, this scheme may utilize a codebook that is larger than the codebook utilized for other methods. In most methods, received codewords (sensed codewords) may be correlated against a defined set of possible codewords (e.g., in a codebook). Thus, use of a small set of codewords (e.g., small codebook) may provide better performance than a larger codebook. Also, since a larger codebook results in smaller distances between codewords, additional errors may be experienced by implementations using larger codebooks.

Structured light patterns may be projected onto a scene by shining light through a codemask. Light projected through the codemask may contain one or more tessellated codemask primitives. Each codemask primitive may contain an array of spatial codes. A codebook or data structure may include the set of codes. Spatial codes, the codemask, and codemask primitives may be generated using basis functions. The periodicities of the basis functions may be chosen to meet the requirements for the aggregate pattern of Hermitian symmetry (for eliminating ghost images and simplifying manufacturing), minimum duty cycle (to ensure a minimum power per codeword), perfect window property (for optimum contour resolution and code packing for high resolution), and randomized shifting (for improved detection on object boundaries). A receiver may make use of the codebook and/or the attributes of the design intended to conform to the constraints when demodulating, decoding, and correcting errors in received patterns.

The size and corresponding resolution of the spatial codes corresponds to a physical spatial extent of a spatial code on a codemask. Size may correspond to the number of rows and columns in a matrix that represents each codeword. The smaller a codeword, the smaller an object that can be detected. For example, to detect and determine a depth difference between a button on a shirt and the shirt fabric, the codeword should be no larger than the size of the button. In some embodiments, each spatial code may occupy four rows and four columns. In some embodiments, the codes may occupy more or fewer rows and columns (rows×columns), to occupy, for example, 3×3, 4×4, 4×5, 5×5, 6×4, or 10×10 rows and columns.

The spatial representation of spatial codes corresponds to how each codeword element is patterned on the codemask and then projected onto a scene. For example, each codeword element may be represented using one or more dots, one or more line segments, one or more grids, some other shape, or some combination thereof.

The "duty cycle" of spatial codes corresponds to a ratio of a number of asserted bits or portions (e.g., "1s") to a number of un-asserted bits or portions (e.g., "0s") in the codeword. When a coded light pattern including the codeword is projected onto a scene, each bit or portion that has a value of "1" may have energy (e.g., "light energy"), but each bit having a value of "0" may be devoid of energy. For a codeword to be easily detectable, the codeword should have sufficient energy.

The "contour resolution" or "perfect window" characteristic of codes indicates that when a codeword is shifted by an amount, for example, a one-bit rotation, the resulting data represents another codeword.

Figure 4:
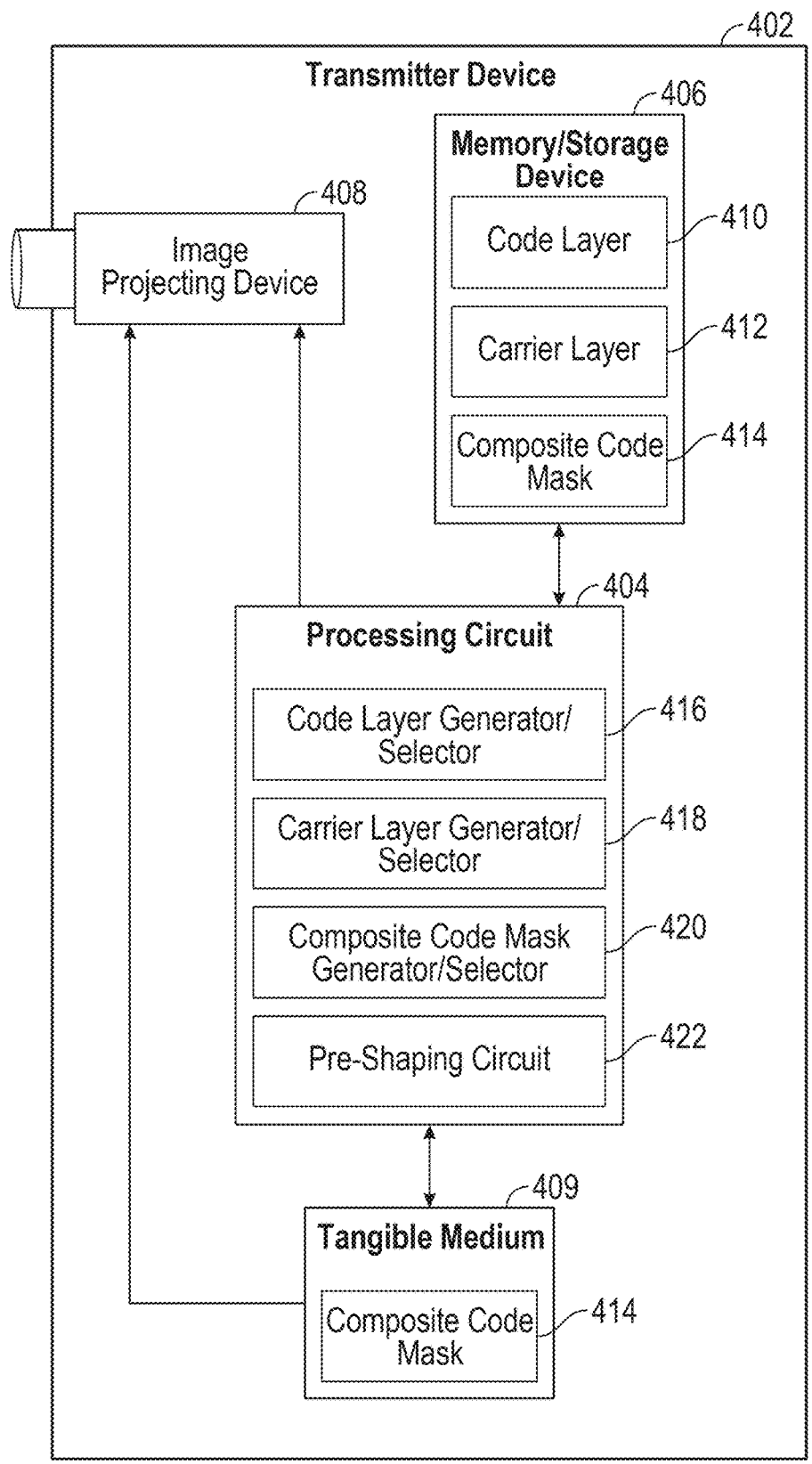
FIG. 4 is a block diagram illustrating an example of a transmitter device that may be configured to generate a composite code mask and/or project such composite code mask.

FIG. 4 is a block diagram illustrating an example of a transmitter device that may be configured to generate a composite code mask and/or project such composite code mask. The transmitter device 402 may include a processing circuit 404 coupled to a memory/storage device 406 (memory device), an image projecting device 408, and/or a tangible medium 409. In some aspects, the transmitter device 402 may correspond to the transmitter 302 discussed above with respect to FIG. 3.

In a first example, the transmitter device 402 may be coupled to include a tangible medium 409. The tangible medium may define, include, and/or store a composite code mask 414. The tangible medium may be a diffractive optical element (DOE) that encodes the code mask, such that when light from a laser or other light source is projected through the DOE at, for example, a near infrared frequency, a codeword pattern image is projected from the transmitter. The composite code mask may include a code layer combined with a carrier layer. The code layer may include uniquely identifiable spatially-coded codewords defined by a plurality of symbols. The carrier layer may be independently ascertainable and distinct from the code layer. The carrier layer may include a plurality of reference objects that are robust to distortion upon projection. At least one of the code layer and carrier layer may be pre-shaped by a synthetic point spread function prior to projection.

In a second example, the processing circuit (or processor) 404 may include a code layer generator/selector 416, a carrier layer generator/selector 418, a composite code mask generator/selector 420 and/or a pre-shaping circuit 422. The code layer generator/selector 416 may select a pre-stored code layer 410 and/or may generate such code layer. The carrier layer generator/selector 418 may select a pre-stored carrier layer 412 and/or may generate such carrier layer. The composite code mask generator/selector may select a pre-stored composite code mask 414 and/or may combine the code layer 410 and carrier layer 412 to generate the composite code mask 414. Optionally, the processing circuit 404 may include a pre-shaping circuit 422 that pre-shapes the composite code mask 414, the code layer 410, and/or the carrier layer 412, to compensate for expected distortion in the channel through which the composite code mask is to be projected.

In some implementations, a plurality of different code layers and/or carrier layers may be available, where each such carrier or code layers may be configured for different conditions (e.g., for objects at different distances, or different configurations between the transmitter device and receiver device). For instance, for objects within a first distance or range, a different combination of code and carrier layers may be used than for objects at a second distance or range, where the second distance is greater than the first distance. In another example, different combination of code and carrier layers may be used depending on the relative orientation of the transmitter device and receiver device.

The image projecting device 408 may serve to project the generated/selected composite code mask onto an object of interest. For instance, a laser or other light source may be used to project the composite code mask onto the object of interest (e.g., through a projection channel). In one example, the composite code mask 414 may be projected in an infrared spectrum, so it may not be visible to the naked eye. Instead, a receiver sensor in the infrared spectrum range may be used to capture such projected composite code mask.

Figure 5:
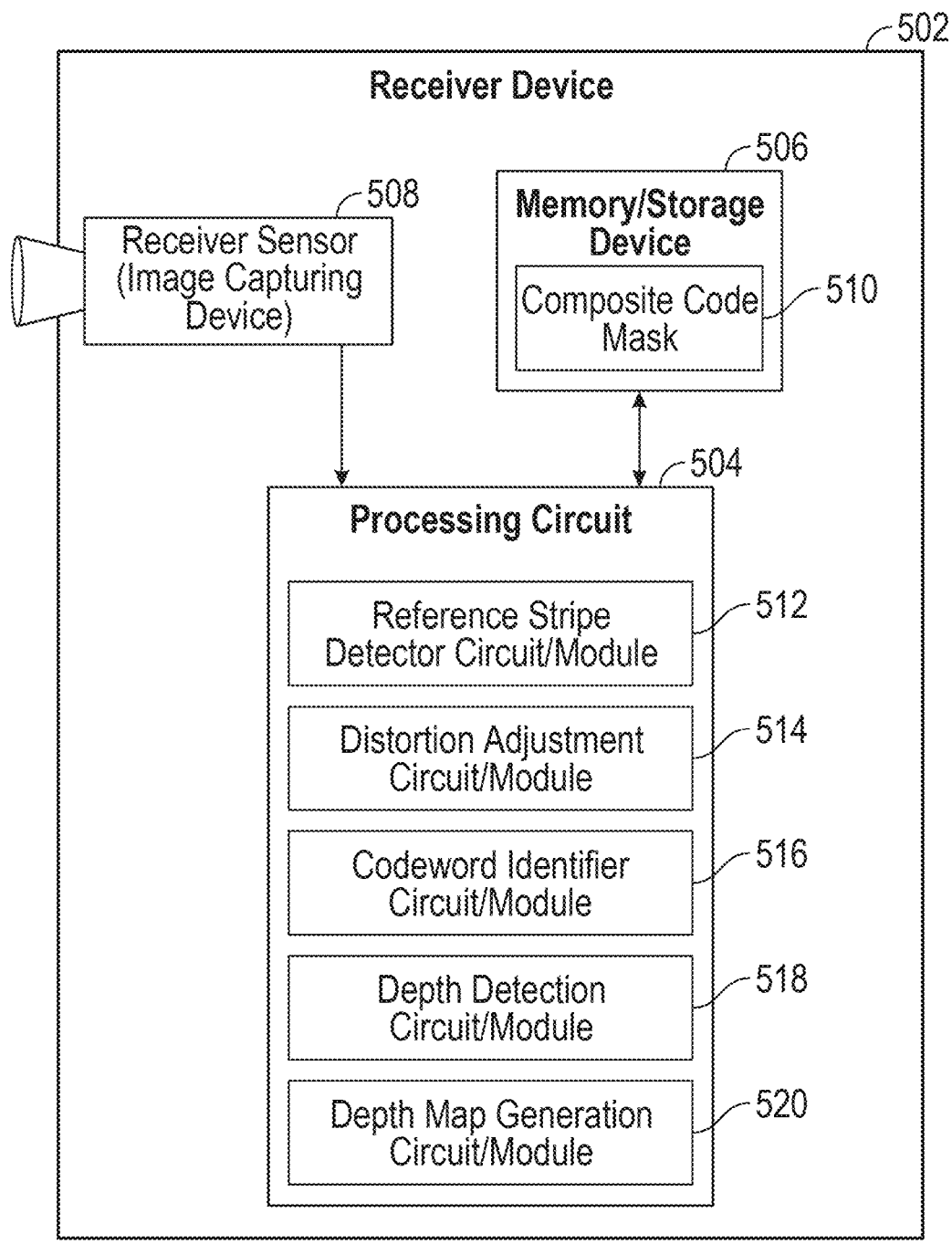
FIG. 5 is a block diagram illustrating an example of a receiver device that may be configured to obtain depth information from a composite code mask.

FIG. 5 is a block diagram illustrating an example of a receiver device 502 that is configured to receive a composite code mask reflected from an object and to determine be depth information from a composite code mask. The receiver device 502 may include a processing circuit 504 coupled to a memory/storage device and a receiver sensor 508 (e.g., an image capturing device 508). In some aspects, the receiver device 502 illustrated in FIG. 5 may correspond to the receiver 304 discussed above with respect to FIG. 3. In some embodiments, the receiver sensor 508 is an image capture device, for example, a camera.

The receiver sensor 508 may be configured to obtain at least a portion of a composite code mask projected on the surface of an object. For instance, the receiver sensor may capture an image of at least a portion of a composite code mask 414 projected on the surface of a target object. The composite code mask 414 may be defined by: (a) a code layer of uniquely identifiable spatially-coded codewords defined by a plurality of symbols, and (b) a carrier layer independently ascertainable and distinct from the code layer and including a plurality of reference objects that are robust to distortion upon projection. At least one of the code layer and carrier layer may have been pre-shaped by a synthetic point spread function prior to projection. In one example, the receiver sensor 508 may capture (sense) the composite code mask in the infrared spectrum.

Still referring to FIG. 5, in some embodiments, the code layer may comprise n1 by n2 binary symbols, where n1 and n2 are integers greater than two. In the composite code mask, each symbol may be a line segment in one of two gray-scale shades distinct from the reference objects. The symbols of the code layer may be staggered in at least one dimension. The carrier layer reference objects may comprise a plurality of equally spaced reference stripes with a guard interval in between. The reference stripes and the guard interval may be of different widths. The width of each reference stripe relative to a guard interval width may be determined by an expected optical spreading of a transmitter device and/or a receiver device.

The processing circuit 504 may include a reference stripe detector circuit/module 512, a distortion adjustment circuit/module 514, a codeword identifier circuit/module 516, a depth detection circuit/module 518, and/or a depth map generation circuit/module 520.

The reference stripe detector circuit/module 512 may be configured to detect reference stripes within the portion of the composite code mask. The distortion adjustment circuit/module 514 may be configured to adjust a distortion of the portion of the composite code mask based on an expected orientation of the reference stripes relative to an actual orientation of the reference stripes. The codeword identifier circuit/module 516 may be configured to obtain a codeword from a window defined within the portion of the composite code mask. The depth detection circuit/module 518 may be configured to obtain depth information for a surface portion of the target object corresponding to the window based on: (a) a single projection of the composite code mask, and (b) a displacement of the window relative to a known reference code mask.

The depth map generation circuit/module 520 may be configured to assemble a depth map for the object based on a plurality of codewords detected as different overlapping windows within the portion of the undistorted composite code mask.

Figure 6:
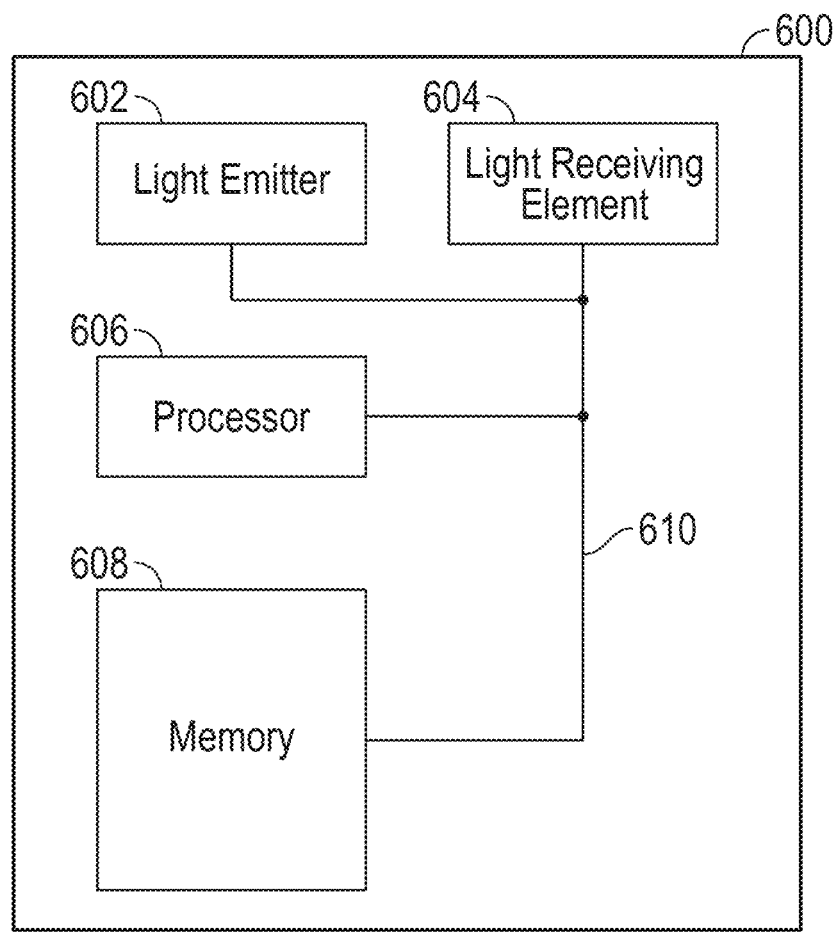
FIG. 6 is a block diagram of one embodiment of an apparatus configured to perform one or more of the error correction methods disclosed herein.

FIG. 6 is a block diagram illustrating an embodiment of an apparatus configured to perform one or more of the error correction methods disclosed herein. Apparatus 600 includes a light emitter 602, a light receiving element 604, a processor 606, and a memory 608. The light emitter 602, light receiving element 604, processor 606, and the memory 608 are operably connected via a bus 610. In some aspects, the light receiving element 604 may correspond to the receiver device 502 discussed above with respect to FIG. 5. In some aspects, the light emitter 602 may correspond to the transmitter device 402 discussed above with respect to FIG. 4.

The memory 608 may store instructions that configure the processor 606 to perform one or more functions of the methods discussed herein. For example, instructions stored in the memory may configure the processor 606 to control the light emitter 602 to emit light that encodes structured light as codewords, in order to illuminate a target object. Instructions stored in the memory 608 may further cause the processor 606 to control the light receiving element 604 to receive light reflecting from the target object and produce data encoded in the reflected light. Instructions stored in the memory may further configure the processor to correct errors in the data produced by the light receiving element according to the method 1500 discussed below.

Figure 7:
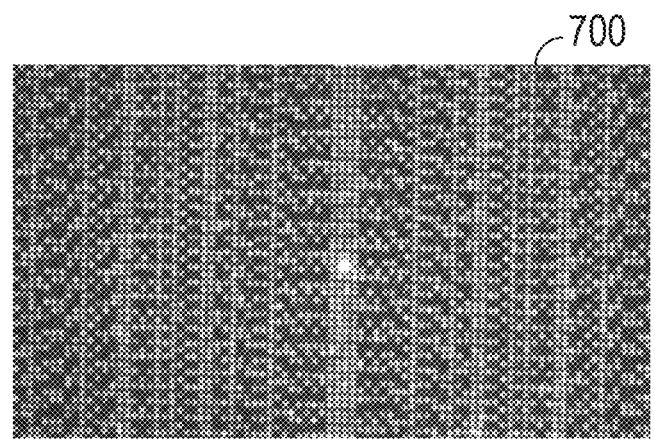
FIG. 7 is a picture illustrating an example of a code mask with arrays of symbols corresponding to bright and dark spots.

FIG. 7 is a picture of an example of a code mask 700 with arrays of symbols corresponding to bright and dark spots. The bright spots correspond to "1" symbols. They are aligned in rows and columns, and separated by black guard intervals and guard bands that give structure to the projected codes and make it possible to determine spatial boundaries of individual symbols and codewords. Codewords occupy a rectangular spatial area that includes rows and columns of symbols. For example, a codeword may include sixteen symbols in four rows and four columns. The "1" symbols with bright spots are visible, but the "0" symbols with dark spots blend into the guard intervals and guard bands.

Figure 8:
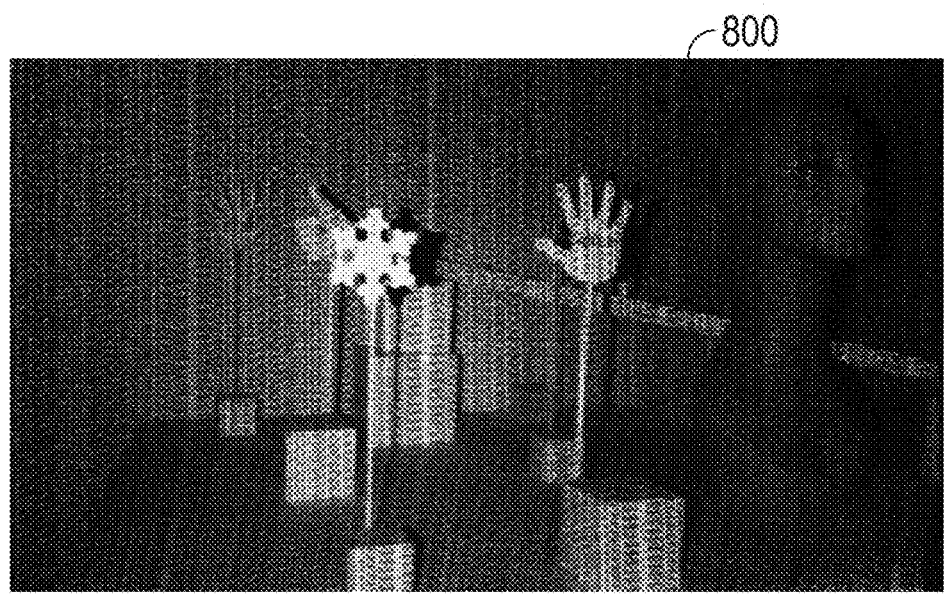
FIG. 8 is a picture illustrating an image of a scene used to generate a depth map, superimposed with codewords projected by a laser through a code mask, such as the code mask of FIG. 7.

FIG. 8 is a picture 800 of an image of a scene used to generate a depth map superimposed with codewords projected by a laser through a code mask, such as the code mask of FIG. 7. The image of FIG. 8 includes a snowflake in the foreground, followed at increasing depths by an open hand to the right of the snowflake, a sculpted head in profile, a closed hand with a thumbs up, and farthest back an open hand to the left of the hand with a thumbs up. As the codewords may be received in a non-visible portion of the frequency spectrum, the superimposed codeword projection of FIG. 8 is printed in false color so that it is visible in FIG. 8.

Figure 9:
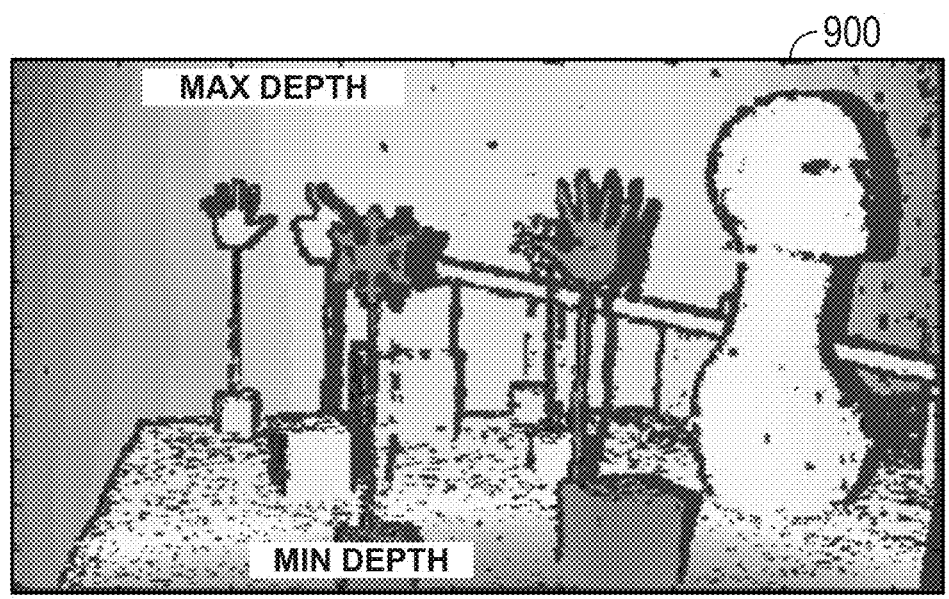
FIG. 9 illustrates an example of a depth map for the scene of FIG. 8.

FIG. 9 illustrates an example of a depth map 900 for the scene of FIG. 8, determined using the structured light techniques described above. The points of minimum and maximum depth are each indicated in FIG. 9. In some embodiments, the depth map 900 is continuously updated at video rate (for example, at 30 frames per second). The existing depth map, generated from previously received frames, provides the set of expected depths for each new image frame. The depth at each location in an image corresponds to the expected depth at each location, and may be used to determine the expected codeword, symbol, and basis function at that location.

Figure 10:
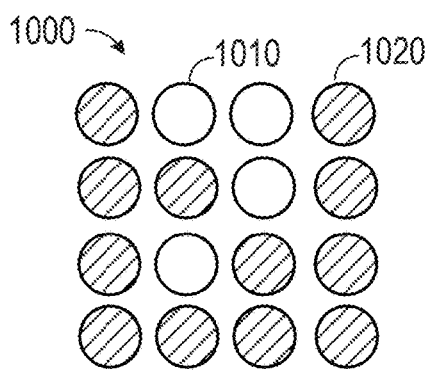
FIG. 10 illustrates an example of a codeword illuminated at an optimal power level. The codeword includes a 4×4 array of "0" or "1" symbols, corresponding to symbols encoded in the code mask of FIG. 7, the symbols having well defined boundaries and clear separation in intensity values between the "0" symbols and the "1."

FIG. 10 illustrates an example of a codeword projected at an optimal power level. The codeword includes a 4×4 array of symbols 1000, corresponding to symbols encoded in the code mask of FIG. 7. The symbols in FIG. 10 have well defined boundaries and clear separation in intensity values between the "0" and "1" symbols. Symbol 1010, as well as the other three symbols depicted as a circle with a black border and no shading, correspond to dark "0" symbol dots. Symbol 1020, as well as the other 11 symbols each depicted as a circle with dark hatching, correspond to bright "1" symbol dots. In the example of FIG. 10, the power level is optimal. Each symbol in FIG. 10 has a clear boundary with no saturation or bleeding over the edges. There is clear intensity separation between the dark dots 1010 and bright dots 1020, as further illustrated in FIG. 11.

Figure 11:
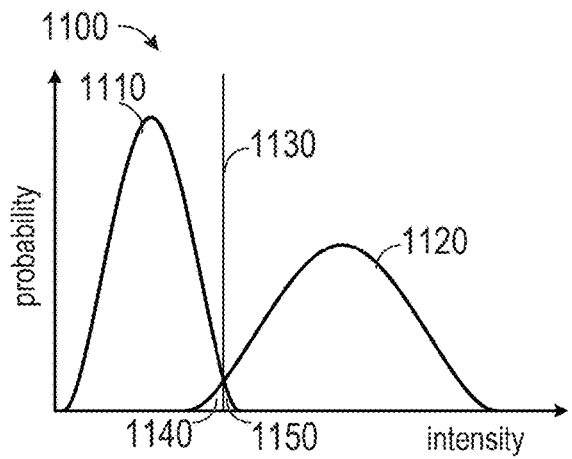
FIG. 11 shows an example of well separated probability distribution functions of intensity values for "0" and "1" symbols encoded in the code mask of FIG. 7, at optimum laser power, as described in FIG. 10.

FIG. 11 shows an example of well separated probability distribution functions 1110 and 1120 of intensity values for the "0" and "1" symbols, respectively, encoded in the code mask of FIG. 7, at an optimal laser power as described in FIG. 10. The horizontal and vertical axes of FIG. 11 correspond to intensity level and probability level, respectively. The probability distribution function 1110 for the dark "0" symbols approximates a Gaussian distribution with a peak at the mean intensity level of $\mu_0$ and a standard deviation of $\sigma_0$. The corresponding variance is $\sigma_0^2$. Similarly, the probability distribution function 1120 for the bright "1" symbols approximates a Gaussian distribution with mean $\mu_1$ and a standard deviation of $\sigma_1$. In this example, $\mu_1 > \mu_0$ and $\sigma_1 > \sigma_0$. The two probability distribution functions 1110 and 1120 are well separated but do overlap.

Received intensity levels to the left of the decision boundary 1130 are more likely to be "0" symbols than "1" symbols. The probability is equal at the decision boundary 1130 where the two probability distribution functions 1110 and 1120 cross, with equal probability values. Received intensity levels to the right of the decision boundary 1130 are more likely to be "1" symbols than "0" symbols. Therefore, "0" symbols with intensity values to the left of the decision boundary 1130 will be correctly classified, while those to the right of the decision boundary, corresponding to the right tail 1150 will be incorrectly classified as "1" symbols.

Similarly, "1" symbols with intensity values to the right of the decision boundary 1130 will be correctly classified, while those to the left of the decision boundary, corresponding to the left tail 1140 will be incorrectly classified as "0" symbols. Accordingly, less separation corresponds to fewer symbol classification errors.

In the example of FIG. 11, the left tail 1140 and right tail 1150 are small because the difference in means of probability distribution functions 1110 and 1120 is relatively large when normalized by the sum of their variances. This relationship may be quantified a code domain statistic that measures contrast, or between cluster to within cluster variation, as defined in equation (1), below. Better separation between symbol intensity levels corresponds to higher values for Λ.

$$\Lambda = \frac{(\mu_1 - \mu_0)^2}{\sigma_0^2 + \sigma_1^2} \quad (1)$$

Figure 12:
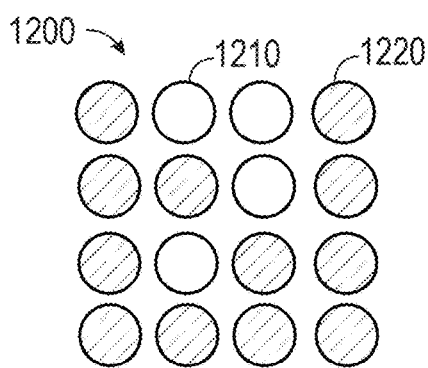
FIG. 12 illustrates an example of the codeword of FIG. 10 but illuminated at a lower power level than in FIG. 10, such that the bright spots are not as bright as in FIG. 10.

FIG. 12 illustrates an example of the codeword of FIG. 10 but illuminated at lower power level, such that the bright spots are not as bright as in FIG. 10, as shown by the lighter hatching in symbol 1220. The symbols in FIG. 12 have well defined boundaries, but there is less clear separation in intensity values between the "0" and "1" symbols. Symbol 1210, as well as the other three symbols depicted as a circle with a black border and no shading, correspond to dark "0" symbol dots. Symbol 1220, as well as the other 11 symbols each depicted as circle with light hatching, correspond to bright "1" symbol dots. In the example of FIG. 10, the power level lower than optimal, the bright "1" symbols 1220 are not as bright as the bright "1" symbols 1020, resulting in less intensity separation between the dark dots and bright dots.

Figure 13:
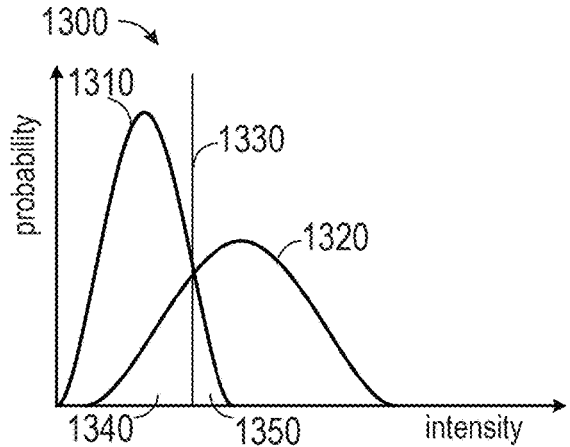
FIG. 13 shows an example of overlapping probability distribution functions of intensity values by symbol for "0" and "1" symbols encoded in the code mask of FIG. 7, at a lower than optimum power level, as described in reference to FIG. 12.

FIG. 13 shows an example of overlapping probability distribution functions of intensity values by symbol for "0" and "1" symbols encoded in the code mask of FIG. 7, at lower than optimum laser power as described in FIG. 12. When compared with FIG. 10, the probability distribution functions 1310 and 1320 for the dark "0" symbols and bright "1" symbols, respectively overlap more because the bright spots are not as bright with the lower laser power level. The decision boundary 1330 is at a lower intensity value than the decision boundary 1130. Right tail 1350 of probability distribution function 1310 is significantly larger in area than right tail 1150. Similarly, Left tail 1340 is significantly larger in area than left tail 1140. With the greater degree of overlap between probability distribution functions 1310 and 1320, with less than optimal laser power levels, than was apparent for probability distribution functions 1110 and 1120, the contrast statistic Λ is lower for less than optimal power than it was for optimal power.

Figure 14:
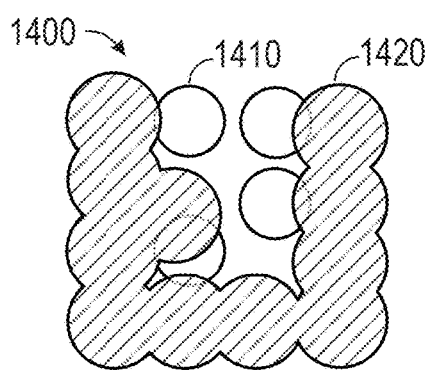
FIG. 14 illustrates an example of the codeword of FIG. 10 but illuminated at a higher power level than in FIG. 10, such that the bright spots are saturated, bleed into each other, and cause some dark spots to appear bright.

FIG. 14 illustrates an example of the codeword of FIG. 10 but illuminated at a higher power level, so that the bright spots are saturated, bleed into each other, and cause some dark spots to appear bright. The symbols in FIG. 12 no longer have well defined boundaries that correspond to the transmitted boundaries because the saturated bright "1" bits 1420 bleed into guard bands, guard intervals, and may even overlap neighboring "0" symbols 1410. This may result it average intensity values for "0" symbol values to increase, the variance of dark "0" symbol values to increase, resulting in less intensity separation between the bright dots and the dark dots.

Figure 15:
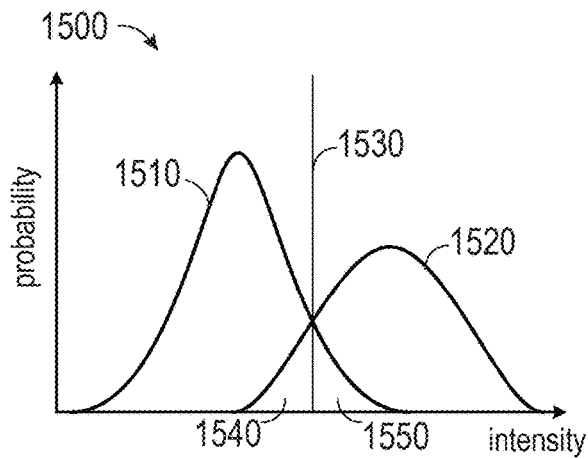
FIG. 15 shows an example of overlapping probability distribution functions of intensity values by symbol for "0" and "1" symbols encoded in the code mask of FIG. 7, at higher than optimum laser power, as described in FIG. 14.

FIG. 15 shows an example of overlapping probability distribution functions of intensity values by symbol for "0" and "1" symbols encoded in the code mask of FIG. 7, at higher than optimum laser power as described in FIG. 14. When compared with FIG. 10, the probability distribution functions 1510 and 1520 for the dark "0" symbols and bright "1" symbols, respectively overlap more because the dark spots appear brighter due to bleeding or blending in of neighboring bright spots, and an increase in the variance of the intensity values for the dark spots, as shown in the probability distribution function 1510. The decision boundary 1530 is at a higher intensity value than the decision boundary 1130. Right tail 1550 of probability distribution function 1510 is significantly larger in area than right tail 1150. Similarly, Left tail 1540 is significantly larger in area than left tail 1140. With the greater degree of overlap between probability distribution functions 1510 and 1520, with more than optimal laser power levels than was apparent for probability distribution functions 1110 and 1120, the contrast statistic Λ is lower for more than optimal power than it was for optimal power.

Figure 16:
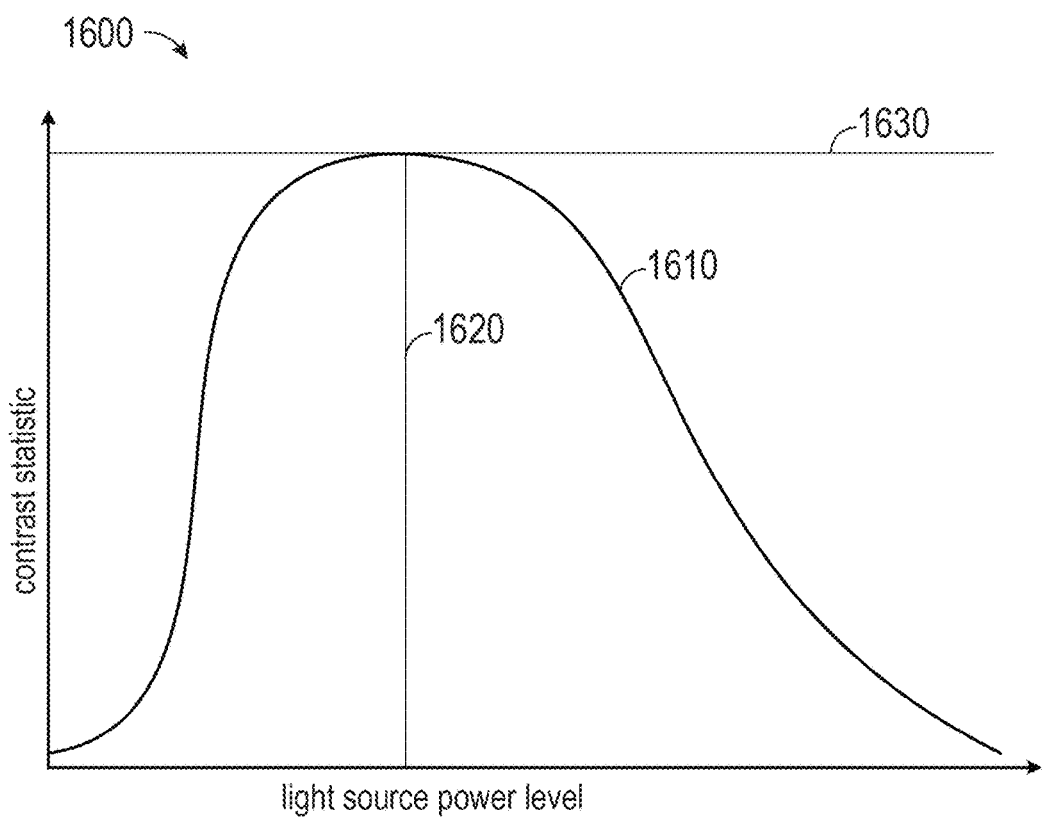
FIG. 16 illustrates an example of a graph of contrast or separation between the two symbols as a function of power level.

FIG. 16 illustrates an example of a graph 1600 of contrast (or separation) between the two symbols as a function of power level of a light source. The horizontal axis corresponds to a light source power level. The vertical axis corresponds to a calculated contrast statistic Λ. This "contrast by power" curve 1610 has a maximum contrast statistic value 1630 at optimal power level 1620. The "contrast by power" curve 1610 has a sharp tail to the left of the optimal power level 1620 as power decreases to the point where it is insufficient to illuminate the bright dots so that they can be seen, and a long tail to the right of the optimal power level 1620 to as power increases towards saturation.

Figure 17:
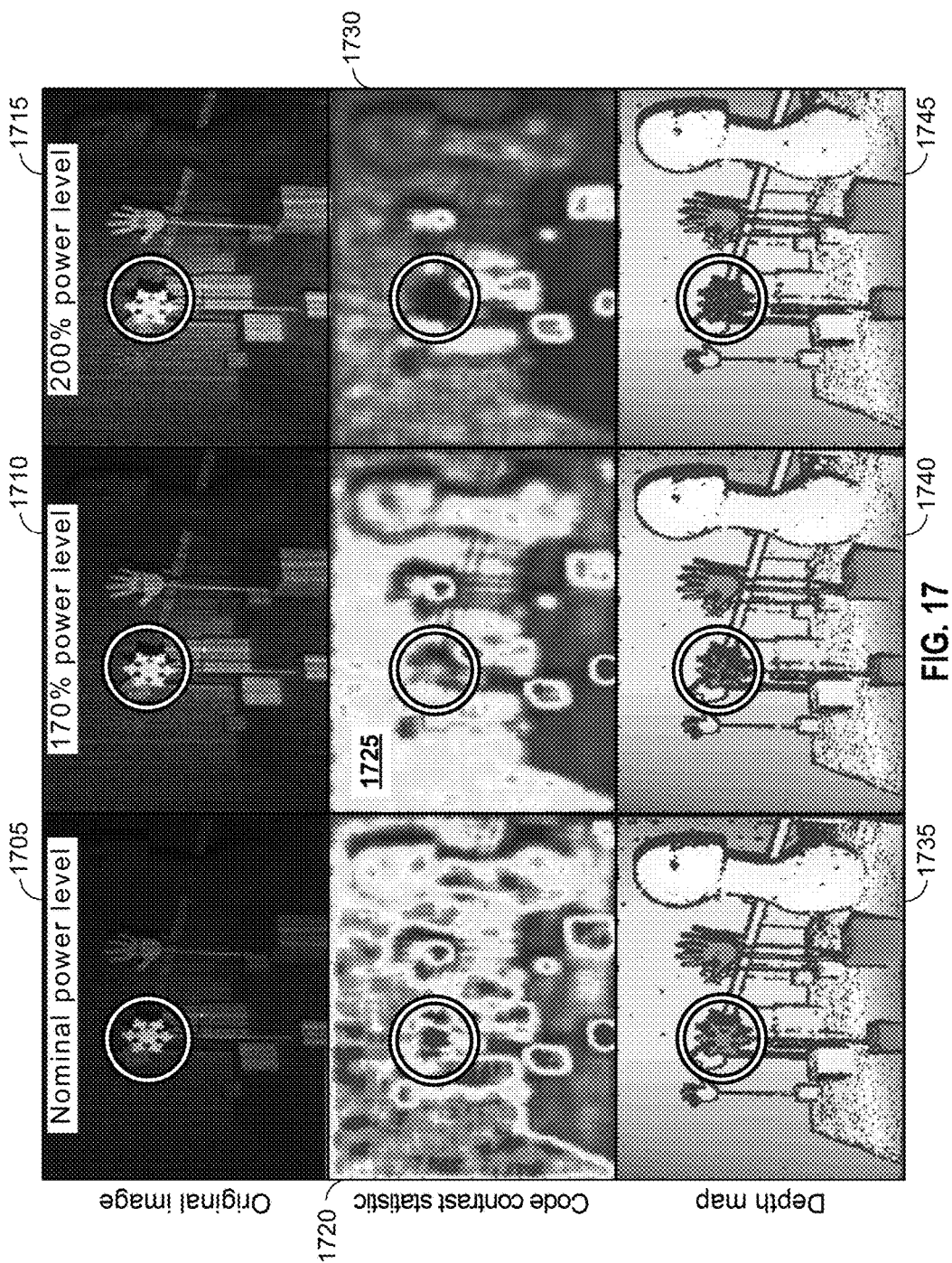
FIG. 17 illustrates structured light images taken at three different power settings in an example embodiment.

FIG. 17 illustrates examples of structured light images taken at three different power level settings of a light source. In a first row of original images in FIG. 17, the corresponding images produced from a code contrast statistic in a second row, and corresponding depth maps in a third row. The first row of original images include an image 1705 generated using a light source at a nominal power level within an optimal range, an image 1710 generated using a light source at a 170% power level above the optimal range, and an image 1715 generated using a light source at a 200% power level well even further from the optimal range. The second row in FIG. 17 includes code contrast statistic images, specifically an image 1720 which corresponds to original image 1705, an image 1725 which corresponds to original image 1710, and an image 1730 which corresponds to original image 1730. The third row in FIG. 17 includes depth maps 1735, 1740 and 1745 generated by the original structured light images 1705, 1710, and 1715, respectively. FIG. 17 accordingly illustrates that as power of the light source increases from 100% and optimal to 170% of optimal and to 200% of optimal, the depth maps provide less accurate information. For example, the circled snowflake depths are well defined in depth map 1735, but are less well defined in depth map 1740, and even less well defined in depth map 1745.

Figure 18:
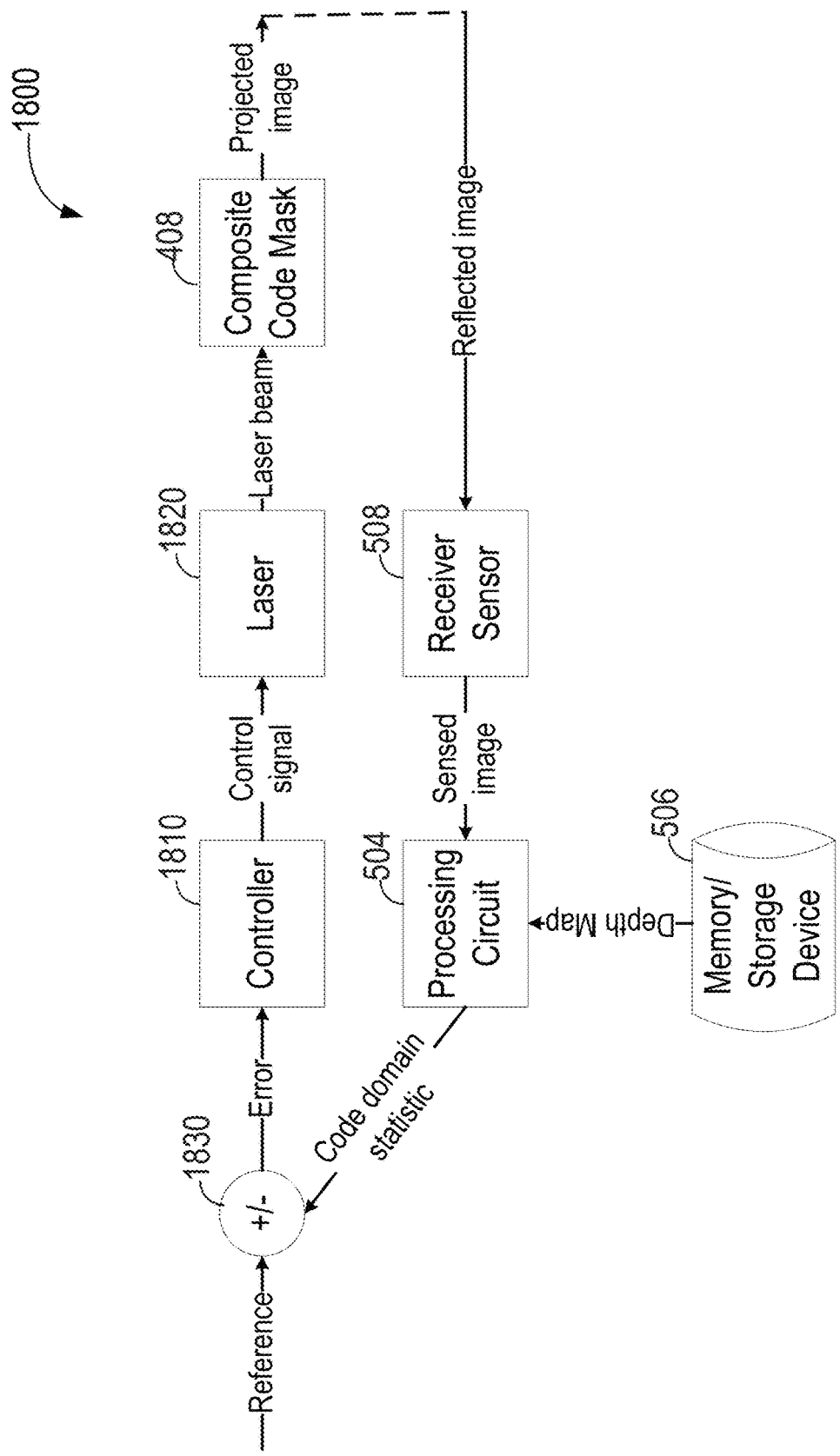
FIG. 18 illustrates an example of a feedback control system that can be used to control a laser in a structured light system to project codewords that are neither too dark to be sensed and distinguished, nor too bright to be saturated when sensed by a receiver in the structured light system.

FIG. 18 illustrates a feedback control system 1800 that can be used to control a laser 1820 in a structured light system to project codewords that are neither too dark to be sensed and distinguished, nor too bright to be saturated, when sensed by a receiver sensor 508 in the structured light system. The feedback control system 1800 (feedback system) includes a controller 1810 coupled to a (light source) laser 1820, a composite code mask 414, a receiver sensor 508, a processing circuit 504, a memory/storage device 506 (memory device), and an adder 1830. These elements are coupled to each other to form a negative feedback loop as illustrated in FIG. 18 to iteratively control the output of the laser 1820 (laser system). In some embodiments, the controller 1810, laser 1820, and composite code mask 414 may be elements of a transmitter device 402 (FIG. 4). The controller 1810 and laser 1820 housed within image projecting device 408 (FIG. 4). In some embodiments, the receiver sensor 508, processing circuit 504, and memory/storage device 506 may be elements of receiver device 502 (FIG. 5). The adder 1830 may be incorporated within either the transmitter device 402 or the receiver device 502 (FIG. 5). As noted above, the transmitter device 402 and receiver device 502 may be housed within a single device. Further, the controller 1810 may include the adder 1830; and/or the controller 1810 and processing circuit 404 may be combined within a single element. Processing circuit 504, adder 1830, controller 1810, and laser 1820 are coupled to, and in electronic communication with, each other. The receiver sensor 508, processing circuit 504, and memory/storage device are coupled to, and in electronic communication with, each other.

Image projecting device 408 (FIG. 4) includes a laser 1820 controlled by controller 1810. The laser 1820 emits light at, for example, a near infrared frequency that is not visible to the human eye but may be sensed by receiver sensor 508. The output level of the laser 1820 can be adjusted by controller 1810. Composite code mask 414, receiver sensor 508, processing circuit 504, and memory/storage device 506 are described above with respect to FIGS. 4 and 5.

Figure 19:
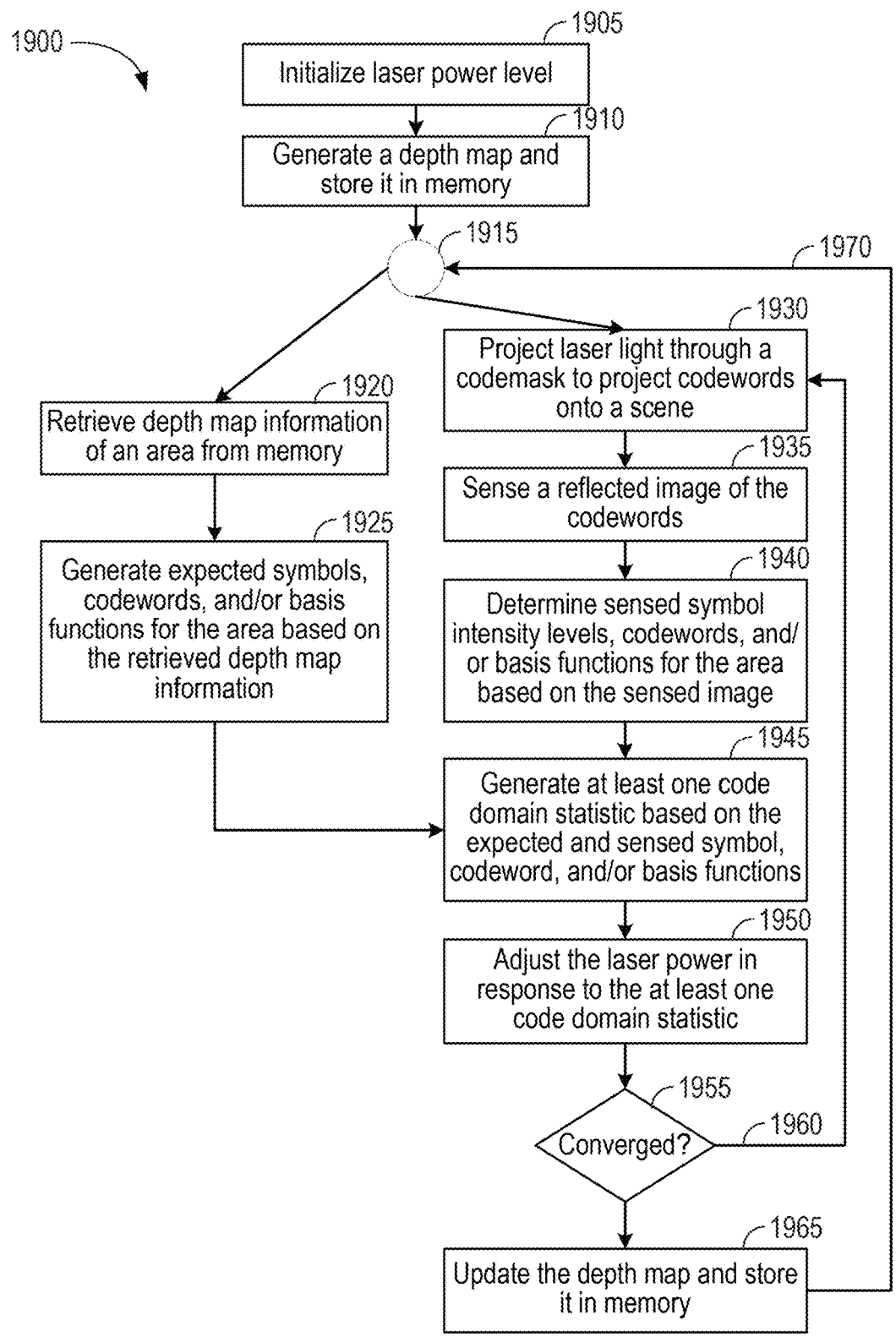
FIG. 19 illustrates an example of a process 1900 for adjusting the power of a structured light transmitter using code domain statistics based existing depth map information and sensed, reflected, images of codewords.

FIG. 19 illustrates an example of a process 1900 for adjusting the power of a structured light transmitter using code domain statistics, using existing depth map information (for example, previously determined depth map, or previously determined codewords of a scene) and sensed images of codewords that are received from (reflected from) a scene.

At block 1905, process 1900 initializes the laser power level. This may be performed, for example, by the image projecting device 408 (FIG. 4), controller 1810 (FIG. 18), or the light emitter 602 (FIG. 6). The initial setting of the laser may be set, for example, based on a previously optimal laser power level that was previously stored in memory, and then retrieved from memory at block 1905 and used to set the laser power level corresponding to an output power of the laser. The stored laser power level may be, for example, a predetermined "factory setting" value or it may have been previously determined during a previous use of the laser and stored in memory At block 1910, process 1900 generates a depth map and stores it in memory. This may be performed, for example, by processing circuit 504 of FIG. 5 and FIG. 18, or processor 606 of FIG. 6. Process 1900 may use structured light methods as described with regard to FIG. 3, in which codeword displacements are used to generate depth information. Process 1900 may generate depth map information from a single structured light frame, or multiple structured light frames. The depth map information may be stored in memory/storage device 506 of FIG. 5 and FIG. 18, or in memory 608 of FIG. 6.

Circular flowchart element 1915 is the starting point for a depth map update cycle. For each update cycle, process 1900 converges to an optimal laser power level as described in blocks 1920-1955, and feedback path 1960. Once converged, process 1900 updates the depth map and stores it in memory in block 1965. Once updated, process 1900 returns to circular flowchart element 1915 via path 1970 for another depth map update cycle. In some embodiments, the laser convergence and depth map update cycle may occur at video rates, for example, 30 or more cycles per second.

At block 1920, process 1900 retrieves depth map information of a scene (or of a certain area or portion of a scene) from memory. This may be performed by processing circuit 504 of FIG. 5 and FIG. 18, or processor 606 of FIG. 6. The depth map information may be retrieved from memory/storage device 506 of FIG. 5 and FIG. 18, or from memory 608 of FIG. 6.

At block 1925, process 1900 generates expected symbols, codewords, and/or basis functions for the area based on the retrieved depth map information by calculating expected symbols, calculating expected basis functions, and/or calculating expected codewords. This may be performed by processing circuit 504 of FIG. 5 and FIG. 18, or processor 606 of FIG. 6. Depth map 1735 is a pictorial representation of depths as a function of location.

Each row and column in the image has a depth value that corresponds to an "expected" depth, or distance from to the surface of an object in the scene. As described with respect to FIG. 3, there is a one-to-one correspondence between codeword displacement and depth for unique codewords within an area. At each codeword location, process 1900 calculates the codeword displacement corresponding to the depth in the retrieved depth map. Process 1900 then translates within the code mask by the codeword displacement to determine the expected codeword at each codeword location. By repeating this over the area, process 1900 determines an array of expected codewords as a function of location.

Each codeword comprises a known array of symbols. By associating each codeword with its symbols, process 1900 determines the corresponding set of symbols at each symbol location.

Furthermore, the codewords at each portion of the codemask map directly to the harmonic basis functions used to generate the codemask. By associating codewords centered at each location with the basis functions used to generate the codemask at the corresponding (displaced) codemask location, process 1900 determines the corresponding set of basis functions at each basis function location.

The expected codewords, expected symbols, and expected basis functions correspond to the codewords, symbols, and basis functions that process 1900 decodes if the laser power is at an optimal level, and the depth map is accurate. Therefore, these values may be used to help converge to an optimal laser power level.

In block 1930, process 1900 projects laser light through a codemask to project codewords onto a scene. The codemask has the same codewords, associated symbols, and are formed by the same harmonic basis functions as the codemask described above with respect to block 1925. This may be performed, for example, by the image projecting device 408 (FIG. 4), laser 1820 (FIG. 18), or the light emitter 602 (FIG. 6). The codewords are continuously projected for time interval. The projected codewords may be projected onto a scene, or objects in a scene.

At block 1935, process 1900 senses a reflected image of the codewords. This may be performed by a receiver sensor 508 of FIG. 5 and FIG. 18, or a sensor integrated with a light source for example, light receiving element 604 integrated with a light emitter 602 of FIG. 6. The received codewords may be received in an image of the scene or objects in the scene.

At block 1940, process 1900 determines intensity levels of sensed symbols, codewords, and/or basis functions for the area based on the sensed image. This may be performed by processing circuit 504 of FIG. 5 and FIG. 18, or processor 606 of FIG. 6. Process 1900 performs the functions described above with respect to FIG. 5 to delineate and detect codewords using processing circuit 504 and modules 512, 514, 516, and 518. Once process 1900 determines the received codewords, it associates each codeword with the known (e.g., stored, pre-existing) set of symbols corresponding to each codeword to generate the set of received codewords. In embodiments where the codemask and codewords are generated using harmonic basis functions, process 1900 may determine received basis functions by applying the incoming intensity values to matched filters, one per harmonic basis function, and determining which matched filter has the highest output. The matched filter with the highest output corresponds to the most likely basis function at that location.

At block 1950, process 1900 generates at least one code domain statistic based on the expected and sensed symbol, codeword, and/or basis functions. This may be performed by processing circuit 504 of FIG. 5 and FIG. 18, or processor 606 of FIG. 6. A first example of a codeword statistic characterizes symbol separation using contrast statistic $\Lambda$ as defined in equation (1), above, to quantify how well the received codewords can be detected. A second codeword statistic characterizes codeword detection accuracy by calculating the percentage of received codewords that match their corresponding expected codewords. A third codeword statistic characterized basis function accuracy by calculating the percentage of received basis functions that match their corresponding expected basis functions. Examples of certain processes to compute contrast, codeword detection accuracy, and basis function detection accuracy statistics are described below with respect to FIGS. 21, 22 and 23, respectively.

At block 1950, process 1900 adjusts the laser power in response to the at least one code domain statistic This may be performed by processing circuit 504 of FIG. 5 and FIG. 18, or processor 606 of FIG. 6. With reference to FIG. 18, the code domain statistic(s) can be combined with a reference value by adder 1830 to determine an error value that is used by controller 1810 to determine whether the laser power level should be increased or decreased. The controller 1810 then transmits a control signal to laser 1820, thereby adjusting the laser power to improve the code domain statistic. This feedback control system 1800 may operate continuously and, in some embodiments, converge to an optimal power level at video frame rates. FIG. 18 describes laser 1820 control as a negative feedback loop. In some embodiments, laser 1820 may be controlled using an adaptive algorithm or using non-linear search techniques.

In block 1955, process 1900 determines whether the laser power level converged. This may be performed by controller 1810 of FIG. 18, processing circuit 504 of FIG. 5 and FIG. 18, or processor 606 of FIG. 6. Process 1900 may determine that the laser power level converged if the power adjustment is less than a threshold value. If the laser power level has not yet converged, and the process 1900 proceeds along feedback path 1960 to block 1930.

If the laser power level has converged, process 1900 proceeds to block 1965. In block 1965, process 1900 updates the depth map and stores it in memory. This may be performed by processing circuit 504 of FIG. 5 and FIG. 18, or processor 606 of FIG. 6. The updated depth map, or updated depth map information, may be stored in memory/storage device 506 of FIG. 5 and FIG. 18, or in memory 608 of FIG. 6. Process 1900 proceeds along path 1970 to circular flowchart element 1915 to start a new depth map update cycle.

Figure 20:
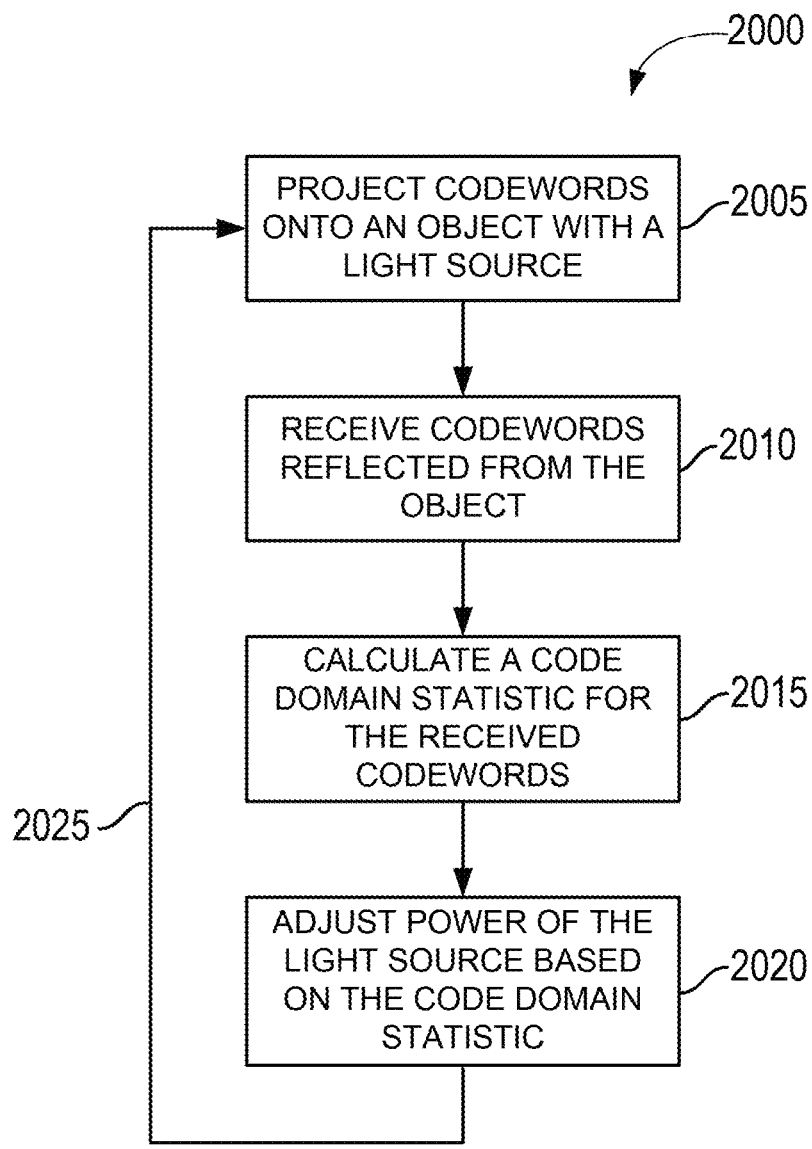
FIG. 20 illustrates an example of a process 2000 for controlling the power of a structured light transmitter using information determined from received codewords that are reflected from an object, including calculation of a code domain statistic.

FIG. 20 illustrates an example of a process 2000 for controlling the power of a structured light transmitter using information determined from one or more received codewords that are reflected from an object.

At block 2005, process 2000 projects patterns of codewords onto one or more objects. This may be performed, for example, by the image projecting device 408 (FIG. 4), laser 1820 (FIG. 18), or the light emitter 602 (FIG. 6). The codewords are continuously projected for time interval. The projected codewords may be projected onto a scene, or objects in a scene.

At block 2010, process 2000 receives the codewords. This may be performed by a receiver sensor 508 of FIG. 5 and FIG. 18, or a sensor integrated with a light source for example, light receiving element 604 integrated with a light emitter 602 of FIG. 6. The received codewords may be received in an image of the scene or objects in the scene.

At block 2015, process 2000 calculates a code domain statistic from one or more of the received codewords. This may be performed by processing circuit 504 of FIG. 5 and FIG. 18, or processor 606 of FIG. 6. Code domain statistics quantify symbol classification accuracy, codeword decoding accuracy, and/or basis function decoding accuracy.

Figure 21:
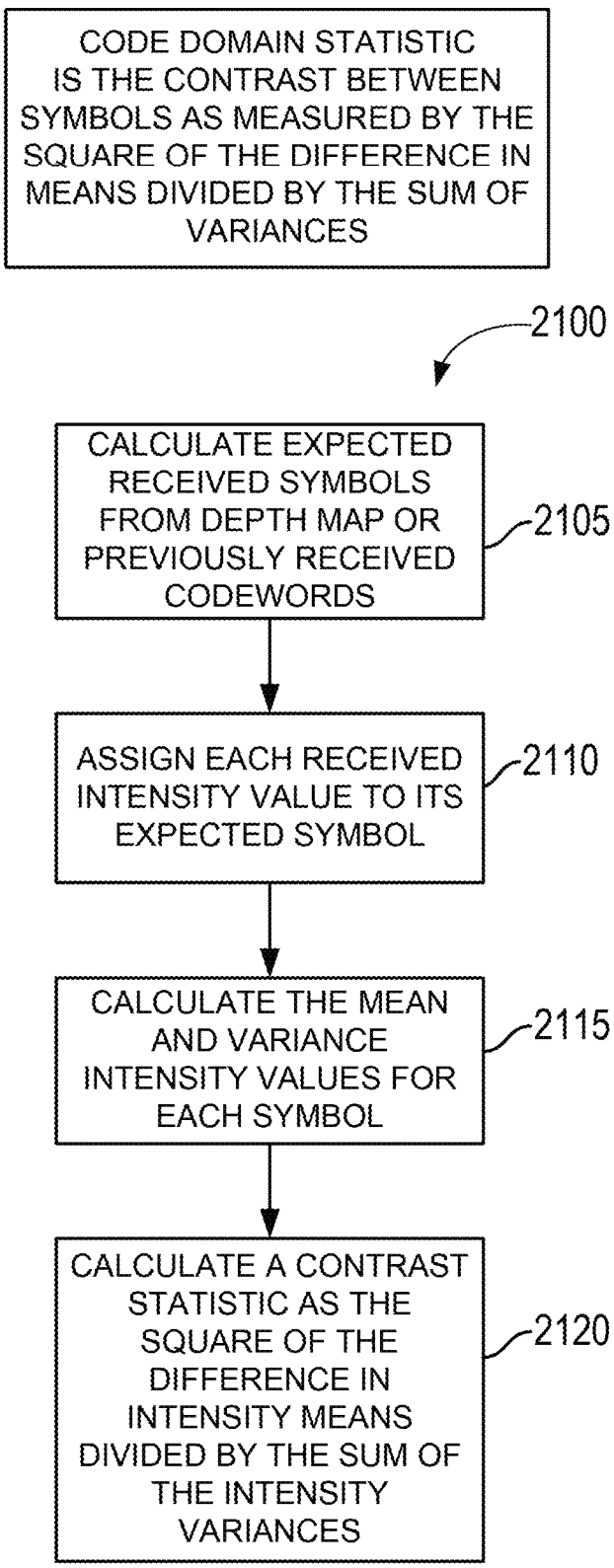
FIG. 21 illustrates an example of a process 2100 for calculating the code domain statistic of process 2000, wherein the code domain statistic is the contrast between symbols as measured by the square of the difference in intensity means divided by the sum of intensity variances.

In a first example, symbol classification accuracy may correlate with the contrast between symbols. The degree of contrast may be quantified as described above with respect to FIG. 11, in which means and standard deviations (and/or corresponding variances) are estimated for the received intensity values for each symbol, and equation (1) is used to determine code domain statistic $\Lambda$. FIG. 21, below, illustrates a process 2100 for determining a code domain statistic. The determined code domain statistic quantifies symbol classification accuracy.

In a second example, a code domain statistic may quantify codeword detection accuracy by calculating the percentage of decoded codewords that match expected codewords based on an existing depth map or previously received codewords.

Figure 22:
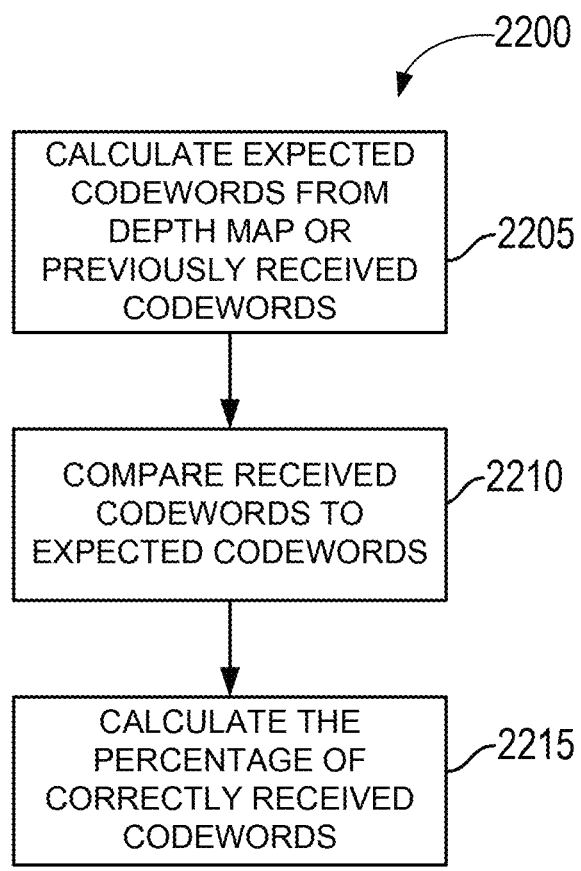
FIG. 22 illustrates an example of a process 2200 for calculating the code domain statistic of process 2000, wherein the code domain statistic is the percentage of received codewords that match the expected codewords.

FIG. 22, below, illustrates a process 2200 for determining a code domain statistic characterizing codeword detection accuracy.

Figure 23:
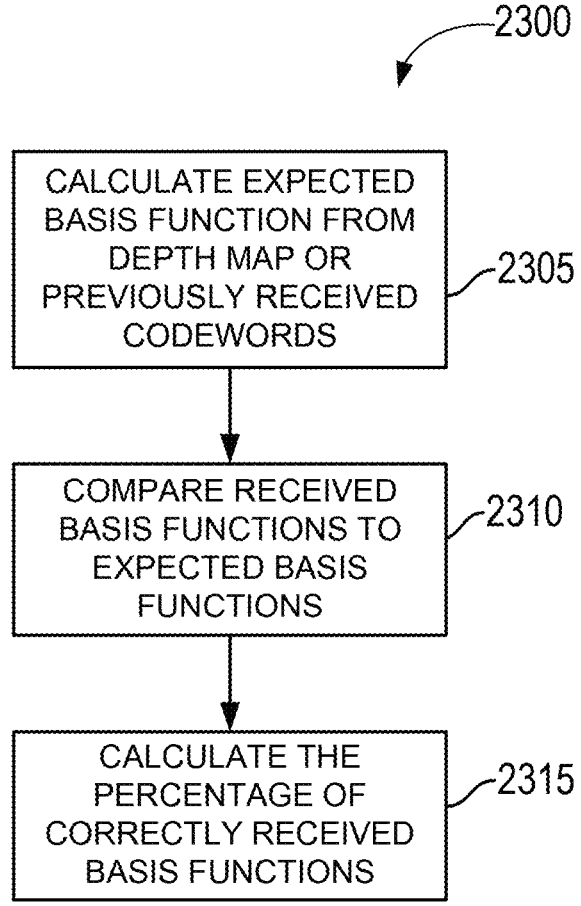
FIG. 23 illustrates an example of a process 2300 for calculating the code domain statistic of process 2000, wherein the code domain statistic is the percentage of received basis functions that match the expected basis functions.

In a third example, a code domain statistic may quantify basis function coding accuracy by calculating the percentage of correctly received basis function. FIG. 23, below, illustrates a process 2300 for determining a code domain statistic. The determined code domain statistic quantifies basis function accuracy.

At block 2020, process 2000 adjusts power of the light source based on the code domain statistic(s), and may loop back through path 2025 to further project codewords at the adjusted power setting of the light source. The process 2000 may adjust the power of the light source in various implementations. One example is a closed loop, negative feedback implementation as described with respect to FIG. 18, in which a code domain statistic determined by processing circuit 504 is compared to a reference value by adder 1830 to generate a difference or error signal used by controller 1810 to determine a control signal that adjusts the power level of laser 1820. In a second example, an adaptive algorithm is used to converge to an optimal laser power level. In a third example, non-linear search techniques are used to identify an optimum laser 1820 power level that maximizes one or more code domain statistics.

FIG. 21 illustrates an example of a process 2100 for calculating the code domain statistic of process 2000, wherein the code domain statistic is the contrast between symbols as measured by the square of the difference in intensity means divided by the sum of the intensity variances.

At block 2105, process 2100 calculates corresponding expected symbols from a depth map and/or previously received codewords. The "expected" received symbols correspond to the most likely (maximum likelihood) symbol. This may be performed by processing circuit 504 of FIG. 5 and FIG. 18 or processor 606 of FIG. 6. The depth map and/or previously received codewords are stored in a memory or storage device. This may be performed by memory/storage device 506 of FIG. 5 and FIG. 18 or memory 608 of FIG. 6.

At block 2110, process 2100 assigns each received intensity value to the expected symbol. This may be performed by processing circuit 504 of FIG. 5 and FIG. 18 or processor 606 of FIG. 6. This makes is possible to identify the received intensity values for locations where "0" symbols are expected, as well as the intensity values for locations where "1" symbols are expected based on the depth map and/or previously received codewords. The received intensity values may be labelled in a data structure by symbol, or incorporated into respective symbol histograms.

At block 2115, process 2100 calculates the mean and variance intensity values for each symbol. This may be performed by processing circuit 504 of FIG. 5 and FIG. 18 or processor 606 of FIG. 6. As discussed above with regard to FIG. 11, the probability distribution functions of intensity values for each symbol may, if considered to be normally distributed, be characterized by its mean and variance (or corresponding standard deviation) of intensity values.

At block 2120, process 2100 calculates a contrast statistic based on the mean and variance intensity values for each symbol. This may be performed by processing circuit 504 of FIG. 5 and FIG. 18 or processor 606 of FIG. 6. For example, contrast statistic $\Lambda$ is the square of the distance in intensity means divided by the sum of intensity variances, as defined in equation 1. Higher contrast statistics correspond to greater symbol separation, less overlap, and higher symbol detection accuracy.

FIG. 22 illustrates an example of a process 2200 for calculating the code domain statistic of process 2000, wherein the code domain statistic is the percentage of received codewords that match the expected codewords. Blocks 2205, 2210, 2215, and 2220 of process 2200 may each be performed by processing circuit 504 of FIG. 5 and FIG. 18 or processor 606 of FIG. 6.

At block 2205, process 2200 calculates expected codewords from a depth map and/or previously received codewords. The depth map and/or previously received codewords are stored, for example, in memory/storage device 506 of FIG. 5 and FIG. 18 or memory 608 of FIG. 6.

At block 2210, process 2200 compares each received codeword after error correction to its expected codeword. The expected codeword is assumed to be correct in the absence of additional information.

At block 2215, process 2200 calculates the percentage of correctly received codewords. The percentage is the ratio of received codewords that match the expected codewords. Higher percentages correspond to greater codeword detection accuracy.

FIG. 23 illustrates an example of a process 2300 for calculating the code domain statistic of process 2000, wherein the code domain statistic is the percentage of received basis functions that match the expected basis functions. Blocks 2305, 2310, and 2315 of process 2300 may each be described below, may each be performed by processing circuit 504 of FIG. 5 and FIG. 18 or processor 606 of FIG. 6.

At block 2305, process 2300 calculates expected basis functions, as defined above with respect to FIG. 3, from a depth map and/or previously received codewords. The depth map and/or previously received codewords are stored, for example, in memory/storage device 506 of FIG. 5 and FIG. 18 or memory 608 of FIG. 6.

At block 2310, process 2300 compares each received basis function to its expected basis function. The expected basis function is assumed to be correct in the absence of additional information.

At block 2315, process 2300 calculates the percentage of correctly received basis functions. The percentage is the ratio of received basis functions that match the expected basis functions. Higher percentages correspond to greater basis function detection accuracy. Higher basis function detection accuracy corresponds to greater codeword detection accuracy.

It should be understood that any reference to an element herein using a designation, for example, "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table for example a look-up table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, for example, various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium, for example, a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A structured light system, comprising:
a memory device configured to store a depth map;
an image projecting device including a laser system configured to project a plurality of symbols;
a receiver device including a sensor, the receiver device configured to sense the projected plurality of symbols reflected from an object;
a processing circuit configured to
retrieve at least a portion of the depth map stored in the memory device and calculate symbols corresponding to the depth map; and
control an output power of the laser system based on the sensed plurality of symbols and the symbols corresponding to the depth map.

2. The structured light system of claim 1, wherein the processing circuit is further configured to update the depth map based on the sensed plurality of symbols, and wherein the memory device is further configured to store the updated depth map.

3. The structured light system of claim 2, wherein the feedback system is configured to determine a code domain statistic comparing the sensed plurality of symbols with the symbols corresponding to the depth map, and wherein the feedback system controls the output power of the laser system based at least in part on the determined code domain statistic.

4. The structured light system of claim 3, wherein the code domain statistic quantifies symbol classification accuracy.

5. The structured light system of claim 4, wherein the code domain statistic is the square of the difference in intensity means divided by the sum of the intensity variances.

6. The structured light system of claim 5, wherein the processing circuit further configured to assign each received intensity value to a corresponding symbol, the processing circuit further configured to calculate a mean intensity value for each symbol, the processing circuit further configured to calculate a variance intensity value for each symbol, and the processing circuit further configured to calculate the code domain statistic as the square of the difference in intensity means divided by the sum of intensity variances.

7. The structured light system of claim 3, wherein the code domain statistic quantifies symbol detection accuracy.

8. The structured light system of claim 7, wherein the code domain statistic is the percent of the sensed symbols reflected from the object that match the calculated symbols corresponding to the depth map.

9. The structured light system of claim 8, wherein the processing circuit is further configured to
compare the sensed symbols reflected from the object to the calculated symbols corresponding to the depth map, and
calculate the percentage of correctly sensed symbols, wherein the correctly sensed symbols correspond to calculated symbols corresponding to the depth map.

10. The structured light system of claim 3, wherein the code domain statistic quantifies basis function accuracy.

11. The structured light system of claim 10, wherein the code domain statistic is the percent of received basis functions that match basis functions corresponding to the depth map.

12. The structured light system of claim 11, wherein the processing circuit is further configured to
calculate basis functions from the depth map and/or previously received symbols, and
compare received basis functions to the calculated basis functions corresponding to the depth map and/or previously received symbols, and
calculate the percentage of correctly received basis functions, wherein correctly received basis functions correspond to the calculated basis functions from the depth map and/or previously received symbols.

13. The structured light system of claim 3, wherein the feedback system is configured to control an output power of the laser system iteratively to converge to a maximum value for the code domain statistic.

14. A method of controlling laser power in a structured light system, comprising:
storing a depth map with a memory device;
projecting a plurality of symbols with a laser system;
sensing the projected plurality of symbols reflected from an object with a receiver sensor;
retrieving a portion of the depth map from the memory device;
calculating symbols corresponding to the depth map; and
controlling output power of the laser system based on the sensed plurality of symbols reflected from the object and the symbols corresponding to the depth map.

15. The method of claim 14, further comprising:
updating the depth map based on the sensed plurality of symbols; and
storing the updated depth map with the memory device.

16. The method of claim 14, further comprising:
determining a code domain statistic comparing the sensed symbols with the calculated symbols corresponding to the depth map; and
controlling output power of the laser system based at least in part on the determined code domain statistic.

17. The method of claim 16, wherein the code domain statistic quantifies symbol classification accuracy.

18. The method of claim 17, wherein the code domain statistic is the square of the difference in intensity means divided by the sum of the intensity variances.

19. The method of claim 18, wherein calculating the plurality of symbols further comprises:
calculating symbols corresponding to the depth map and/or previously received symbols;
assigning each received intensity value to calculated symbols;
calculating a mean intensity value for each symbol;
calculating a variance intensity value for each symbol; and
calculating the code domain statistic as the square of the difference in intensity means divided by the sum of the intensity variances.

20. The method of claim 16, wherein the code domain statistic quantifies symbol detection accuracy.

21. The method of claim 20, wherein the code domain statistic is the percent of sensed symbols that match the calculated symbols corresponding to the depth map.

22. The method of claim 21, further comprising:
comparing sensed symbols to symbols corresponding to the depth map;
calculating the percentage of correctly sensed symbols, wherein correctly sensed symbols correspond to symbols corresponding to the depth map.

23. The method of claim 16, wherein the code domain statistic quantifies basis function accuracy.

24. The method of claim 23, wherein the code domain statistic is the percentage of received basis functions that match basis functions corresponding to the depth map.

25. The method of claim 24, further comprising:
calculating basis functions corresponding to the depth map and/or previously received codewords;
comparing received basis functions to calculated basis functions, and
calculating the percentage of correctly received basis functions, wherein correctly received basis functions correspond to the calculated basis functions.

26. The method of claim 16, further comprising controlling an output power of the laser system iteratively to converge to a maximum value for the code domain statistic.

27. A structured light system, comprising:
means for storing a depth map;
means for projecting a plurality of symbols;
means for sensing the projected plurality of symbols reflected from an object;
means for retrieving a portion of the depth map from the means for storing a depth map;
means for calculating symbols corresponding to the depth map; and
means for controlling output power of the projecting means based on a comparison between the sensed plurality of symbols and the symbols corresponding to the depth map.

28. The structured light system of claim 27, wherein the storing means comprises a memory device, wherein the project means comprises a laser system, wherein the sensing means comprises a receiver sensor, wherein the retrieving means comprises a processing circuit, wherein the calculating means comprising the processing circuit, and wherein the controlling means comprises a feedback system.

29. The structured light system of claim 27, further comprising:
means for determining a code domain statistic comparing the sensed plurality of symbols with the calculated symbols corresponding to the depth map; and
means for controlling output power of the laser system based at least in part on the determined code domain statistic.

30. A non-transitory computer-readable medium storing instructions that when executed cause a processor to perform a method of controlling output power of a laser system of a structured light system, the method comprising:
storing a depth map with a memory device;
projecting a plurality of symbols with the laser system;
sensing the projected plurality of symbols reflected from an object with a receiver sensor;

retrieving a portion of the depth map from the memory device;
calculating symbols corresponding to the depth map; and
controlling output power of the laser system based on the sensed plurality of symbols and the calculated symbols corresponding to the depth map.

* * * * *